US007708949B2

(12) United States Patent
Stone et al.

(10) Patent No.: US 7,708,949 B2
(45) Date of Patent: May 4, 2010

(54) METHOD AND APPARATUS FOR FLUID DISPERSION

(75) Inventors: Howard A. Stone, Brookline, MA (US); Shelley L. Anna, Pittsburgh, PA (US); Nathalie Bontoux, Cagnes sur Mer (FR); Darren R. Link, Cambridge, MA (US); David A. Weitz, Bolton, MA (US); Irina Gitlin, Brookline, MA (US); Eugenia Kumacheva, Toronto (CA); Piotr Garstecki, Cambridge, MA (US); Willow Diluzio, Westford, MA (US); George M. Whitesides, Newton, MA (US)

(73) Assignees: President and Fellows of Harvard College, Cambridge, MA (US); Governing Council of the Univ. of Toronto, Toronto (CA)

( * ) Notice: Subject to any disclaimer, the term of this patent is extended or adjusted under 35 U.S.C. 154(b) by 908 days.

(21) Appl. No.: 11/024,228

(22) Filed: Dec. 28, 2004

(65) Prior Publication Data

US 2005/0172476 A1 Aug. 11, 2005

Related U.S. Application Data

(63) Continuation of application No. PCT/US03/20542, filed on Jun. 30, 2003.

(60) Provisional application No. 60/392,195, filed on Jun. 28, 2002, provisional application No. 60/424,042, filed on Nov. 5, 2002.

(51) Int. Cl.

| | |
|---|---|
| *B01L 3/02* | (2006.01) |
| *G01N 11/04* | (2006.01) |
| *B01L 99/00* | (2010.01) |
| *G05D 7/00* | (2006.01) |

(52) U.S. Cl. ...................... 422/100; 422/68.1; 422/103; 422/110; 436/180

(58) Field of Classification Search .................. 422/50, 422/68.1, 100, 81, 82; 436/43, 174, 180, 436/52, 53

See application file for complete search history.

(56) References Cited

U.S. PATENT DOCUMENTS

| | | | |
|---|---|---|---|
| 3,980,541 | A | 9/1976 | Aine |
| 4,279,345 | A | 7/1981 | Allred |
| 4,508,265 | A | 4/1985 | Jido |
| 4,865,444 | A | 9/1989 | Green et al. |

(Continued)

FOREIGN PATENT DOCUMENTS

| | | |
|---|---|---|
| DE | 43 08 839 A1 | 9/1994 |

(Continued)

OTHER PUBLICATIONS

S. Sugiura et al., Langmuir, 17: 5562-5566, 2001.*

(Continued)

*Primary Examiner*—Jill Warden
*Assistant Examiner*—Timothy G Kingan
(74) *Attorney, Agent, or Firm*—Wolf, Greenfield & Sacks, P.C.

(57) ABSTRACT

A microfluidic method and device for focusing and/or forming discontinuous sections of similar or dissimilar size in a fluid is provided. The device can be fabricated simply from readily-available, inexpensive material using simple techniques.

17 Claims, 10 Drawing Sheets

U.S. PATENT DOCUMENTS

| | | | |
|---|---|---|---|
| 4,931,225 | A | 6/1990 | Cheng |
| 5,204,112 | A | 4/1993 | Hope et al. |
| 5,378,957 | A | 1/1995 | Kelly |
| 5,452,955 | A | 9/1995 | Lundstrom |
| 5,512,131 | A | 4/1996 | Kumar et al. |
| 5,617,997 | A | 4/1997 | Kobayashi et al. |
| 5,681,600 | A | 10/1997 | Antinone et al. |
| 5,762,775 | A | 6/1998 | DePaoli et al. |
| 5,935,331 | A | 8/1999 | Naka et al. |
| 5,942,443 | A | 8/1999 | Parce et al. |
| 5,980,936 | A | 11/1999 | Krafft et al. |
| 6,046,056 | A | 4/2000 | Parce et al. |
| 6,116,516 | A | 9/2000 | Ganan-Calvo |
| 6,119,953 | A | 9/2000 | Ganan-Calvo et al. |
| 6,120,666 | A | 9/2000 | Jacobson et al. |
| 6,149,789 | A | 11/2000 | Benecke et al. |
| 6,150,180 | A | 11/2000 | Parce et al. |
| 6,174,469 | B1 | 1/2001 | Ganan-Calvo |
| 6,187,214 | B1 | 2/2001 | Ganan-Calvo |
| 6,189,803 | B1 | 2/2001 | Ganan-Calvo |
| 6,196,525 | B1 | 3/2001 | Ganan-Calvo |
| 6,197,835 | B1 | 3/2001 | Ganan-Calvo |
| 6,221,654 | B1 | 4/2001 | Quake et al. |
| 6,234,402 | B1 | 5/2001 | Ganan-Calvo |
| 6,241,159 | B1 | 6/2001 | Ganan-Calvo et al. |
| 6,248,378 | B1 | 6/2001 | Ganan-Calvo |
| 6,267,858 | B1 | 7/2001 | Parce et al. |
| 6,274,337 | B1 | 8/2001 | Parce et al. |
| 6,299,145 | B1 | 10/2001 | Ganan-Calvo |
| 6,301,055 | B1 | 10/2001 | Legrand et al. |
| 6,306,659 | B1 | 10/2001 | Parce et al. |
| 6,355,198 | B1 | 3/2002 | Kim et al. |
| 6,357,670 | B2 | 3/2002 | Ganan-Calvo |
| 6,386,463 | B1 | 5/2002 | Ganan-Calvo |
| 6,394,429 | B2 | 5/2002 | Ganan-Calvo |
| 6,399,389 | B1 | 6/2002 | Parce et al. |
| 6,405,936 | B1 | 6/2002 | Ganan-Calvo |
| 6,408,878 | B2 | 6/2002 | Unger et al. |
| 6,429,025 | B1 | 8/2002 | Parce et al. |
| 6,432,148 | B1 | 8/2002 | Ganan-Calvo |
| 6,432,630 | B1 | 8/2002 | Blankenstein |
| 6,450,189 | B1 | 9/2002 | Ganan-Calvo |
| 6,464,886 | B2 | 10/2002 | Ganan-Calvo |
| 6,489,103 | B1 | 12/2002 | Griffiths et al. |
| 6,506,609 | B1 | 1/2003 | Wada et al. |
| 6,508,988 | B1 | 1/2003 | Van Dam et al. |
| 6,540,895 | B1 | 4/2003 | Spence et al. |
| 6,554,202 | B2 | 4/2003 | Ganan-Calvo |
| 6,557,834 | B2 | 5/2003 | Ganan-Calvo |
| 6,558,944 | B1 | 5/2003 | Parce et al. |
| 6,558,960 | B1 | 5/2003 | Parce et al. |
| 6,560,030 | B2 | 5/2003 | Legrand et al. |
| 6,592,821 | B1 | 7/2003 | Wada et al. |
| 6,608,726 | B2 | 8/2003 | Legrand et al. |
| 6,610,499 | B1 * | 8/2003 | Fulwyler et al. ............. 435/7.1 |
| 6,614,598 | B1 | 9/2003 | Quake et al. |
| 6,630,353 | B1 | 10/2003 | Parce et al. |
| 6,645,432 | B1 | 11/2003 | Anderson et al. |
| 6,660,252 | B2 | 12/2003 | Matathia et al. |
| 6,752,922 | B2 | 6/2004 | Huang et al. |
| 6,790,328 | B2 | 9/2004 | Jacobson et al. |
| 6,806,058 | B2 | 10/2004 | Jesperson et al. |
| 6,890,487 | B1 * | 5/2005 | Sklar et al. .................... 422/93 |
| 6,935,768 | B2 | 8/2005 | Lowe et al. |
| 7,068,874 | B2 | 6/2006 | Wang et al. |
| 7,115,230 | B2 | 10/2006 | Sundararajan et al. |
| 7,268,167 | B2 | 9/2007 | Higuchi et al. |
| 7,294,503 | B2 * | 11/2007 | Quake et al. ............. 435/288.5 |
| 2002/0004532 | A1 | 1/2002 | Matathia et al. |
| 2002/0008028 | A1 | 1/2002 | Jacobson et al. |
| 2002/0119459 | A1 | 8/2002 | Griffiths |
| 2003/0015425 | A1 | 1/2003 | Bohm et al. |
| 2003/0039169 | A1 | 2/2003 | Ehrfeld et al. |
| 2003/0124586 | A1 | 7/2003 | Griffiths et al. |
| 2004/0096515 | A1 | 5/2004 | Bausch et al. |
| 2004/0182712 | A1 | 9/2004 | Basol |
| 2005/0032238 | A1 | 2/2005 | Karp et al. |
| 2005/0032240 | A1 | 2/2005 | Lee et al. |
| 2005/0172476 | A1 | 8/2005 | Stone et al. |
| 2005/0183995 | A1 | 8/2005 | Deshpande et al. |
| 2005/0207940 | A1 | 9/2005 | Butler et al. |
| 2005/0221339 | A1 | 10/2005 | Griffiths et al. |
| 2006/0051329 | A1 | 3/2006 | Lee et al. |
| 2006/0078888 | A1 | 4/2006 | Griffiths et al. |
| 2006/0078893 | A1 | 4/2006 | Griffiths et al. |
| 2006/0108012 | A1 | 5/2006 | Barrow et al. |
| 2006/0163385 | A1 | 7/2006 | Link et al. |
| 2006/0263888 | A1 | 11/2006 | Fritz et al. |
| 2007/0003442 | A1 | 1/2007 | Link et al. |
| 2007/0054119 | A1 | 3/2007 | Garstecki et al. |
| 2007/0056853 | A1 | 3/2007 | Aizenberg et al. |
| 2007/0195127 | A1 | 8/2007 | Ahn et al. |
| 2008/0003142 | A1 | 1/2008 | Link et al. |
| 2009/0012187 | A1 | 1/2009 | Chu et al. |
| 2009/0131543 | A1 | 5/2009 | Weitz et al. |

FOREIGN PATENT DOCUMENTS

| | | | |
|---|---|---|---|
| DE | 199 61 257 | A1 | 7/2001 |
| DE | 100 15 109 | A1 | 10/2001 |
| DE | 100 41 823 | A1 | 3/2002 |
| EP | 0249007 | A2 | 12/1987 |
| EP | 0718038 | B1 | 8/1992 |
| EP | 1362634 | A1 | 11/2003 |
| EP | 1741482 | A2 | 1/2007 |
| GB | 1 446 998 | | 8/1976 |
| WO | WO 96/29629 | A2 | 3/1996 |
| WO | WO 99/61888 | A2 | 12/1999 |
| WO | WO 00/47322 | A2 | 8/2000 |
| WO | WO 00/54735 | A1 | 9/2000 |
| WO | WO 00/70080 | A1 | 11/2000 |
| WO | WO 00/76673 | A1 | 12/2000 |
| WO | WO 01/12327 | A1 | 2/2001 |
| WO | WO 01/68257 | A1 | 9/2001 |
| WO | WO 01/69289 | A2 | 9/2001 |
| WO | WO 01/72431 | A1 | 10/2001 |
| WO | WO 01/89787 | A2 | 11/2001 |
| WO | WO 01/89788 | A2 | 11/2001 |
| WO | WO 01/94635 | A2 | 12/2001 |
| WO | WO 02/18949 | A2 | 3/2002 |
| WO | WO 02/47665 | A2 | 6/2002 |
| WO | WO 02/103011 | A2 | 12/2002 |
| WO | WO 03/011443 | A2 | 2/2003 |
| WO | WO 2004/002627 | A2 | 1/2004 |
| WO | WO 2004/002627 | A3 | 1/2004 |
| WO | WO 2004/038363 | A2 | 5/2004 |
| WO | WO 2004/071638 | A2 | 8/2004 |
| WO | WO 2004/091763 | A2 | 10/2004 |
| WO | WO 2005/002730 | A1 | 1/2005 |
| WO | WO 2005/021151 | A1 | 3/2005 |
| WO | WO 2005/049787 | A2 | 6/2005 |
| WO | WO 2005/103106 | A1 | 11/2005 |
| WO | WO 2006/002641 | A1 | 1/2006 |
| WO | WO 2006/078841 | A1 | 7/2006 |
| WO | WO 2006/096571 | A1 | 9/2006 |
| WO | WO 2006/101851 | A2 | 9/2006 |
| WO | WO 2007/081385 | A2 | 7/2007 |
| WO | WO 2007/089541 | A2 | 8/2007 |
| WO | WO 2008/121342 | A2 | 10/2008 |

OTHER PUBLICATIONS

Ahn, K., et al., "Dielectrophoretic manipulation of drops for high-speed microfluidic sorting devices," *Applied Physics Letters*, 2006, 88, 024104-1-024104-3.

Ando, S., et al., "PLGA Microspheres Containing Plasmid DNA: Preservation of Supercoiled DNA via Cryopreparation and Carbohydrate Stabilization," *Journal of Pharmaceutical Sciences*, vol. 88, No. 1, pp. 126-130 (1999).

Anna, S.L., et al., "Formation of dispersions using "flow focusing" in microchannels," *Applied Physics Letters*, vol. 82, No. 3, pp. 364-366 (2003).

Benichou, A., et al., "Double Emulsions Stabilized by New Molecular Recognition Hybrids of Natural Polymers," *Polym. Adv. Tehcnol.*, vol. 13, pp. 1019-1031 (2002).

Bibette, J., et al., "Emulsions: basic principles", Rep. Prog. Phys.. 62 (1999) 969-1033.

Chao, W., et al., "Control of Concentration and Volume Gradients in Microfluidic Droplet Arrays for Protein Crystallization Screening", 26th Annual International Conference of the IEEE Engineering in Medicine and Biology Society, Sep. 1-5, 2004, Francisco, California.

Chao, W., et al., "Droplet Arrays in Microfluidic Channels for Combinatorial Screening Assays", Hilton Head 2004: A Solid State Sensor, Actuator and Microsystems Workshop, Hilton Head Island, South Carolina, Jun. 6-10, 2004.

Chen, C.C., et al., "Microfluidic Switch for Embryo and Cell Sorting," The 12th International Conference on Solid State Sensors, Actuators, and Microsystems, Boston, MA Jun. 8-12, 2003 *Transducers*, vol. 1, pp. 659-662 (2003).

Chen, L.X., et al., "Capturing a Photoexcited Molecular Structure Through Time-Domain X-ray Absorption Fine Structure," *Science*, vol. 292, pp. 262-264 (2001).

Cheng, Z., et al., "Electro flow focusing in microfluidic devices," Microfluidics Poster, presented at DEAS, "Frontiers in Nanoscience," presented Apr. 10, 2003.

Chiba, M., et al., "Controlled protein delivery from biodegradable tyrosine-containing poly(anhydride-co-imide) microspheres," *Biomaterials*, vol. 18, pp. 893-901 (1997).

Cohen, S., et al., "Controlled Delivery Systems for Proteins Based on Poly(Lactic/Glycolic Acid) Microspheres," *Pharmaceutical Research*, vol. 8, No. 6, pp. 713-720 (1991).

Collins, J., et al., "Microfluidic flow transducer based on the measurement of electrical admittance", *Lab on a Chip*, vol. 4, 2004.

Collins, J., et al., "Optimization of Shear Driven Droplet Generation in a Microfluidic Device", ASME International Mechanical Engineering Congress and R&D Expo 2003, Washington.

Cortesi, R., et al., "Production of lipospheres as carriers for bioactive compounds," *Biomaterials*, vol. 23, pp. 2283-2294 (2002).

Dinsmore, A.D., et al., "Colloidosomes: Selectively Permeable Capsules Composed of Colloidal Particles", Science, Nov. 2002, 298:1006-1009.

Dinsmore, A.D., et al., "Colloidosomes: Selectively-Permeable Capsules Composed of Colloidal Particles", Supplementary Material.

Dove, A., et al., *Nature Biotechnology*, Dec. 2002, 20:1213.

Edris, A., et al., "Encapsulation of orange oil in a spray dried double emulsion," *Nahrung/Food*, vol. 45, No. 2, pp. 133-137 (200)).

Eow, J.S., et al. "Electrostatic and hydrodynamic separation of aqueous drops in a flowing viscous oil," *Chemical Engineering and Processing*, vol. 41, pp. 649-657 (2002).

Eow, J.S., et al., "Electrocoalesce-separators for the separation of aqueous drops from a flowing dielectric viscous liquid," *Separation and Purification Technology*, vol. 29, pp. 63-77 (2002).

Eow, J.S., et al., "Electrostatic enhancement of coalescence of water droplets in oil: a review of the technology," *Chemical Engineering Journal*, vol. 85, pp. 357-368 (2002).

Eow, J.S., et al., "Motion, deformation and break-up of aqueous drops in oils under high electric field strengths," *Chemical Engineering and Processing*, vol. 42, pp. 259-272 (2003).

Eow, J.S., et al., "The bahaviour of a liquid-liquid interface and drop-interface coalescence under the influence of an electric field," *Colloids and Surfaces A: Physiochem. Eng. Aspects*, pp. 101-123 (2003).

Fisher, J.S., et al., "Cell Encapsulation on a Microfluidic Platform," The Eighth International Conference on Miniaturised Systems for Chemistry and Life Sciences, MicroTAS 2004, Sep. 26-30, Malmo, Sweden.

Fu, A.Y., et al., "A microfabricated fluorescence-activated cell sorter," *Nature Biotechnology*, vol. 17, pp. 1109-1111 (1999).

Gallarate, M., et al., "On the stability of ascorbic acid in emulsified systems for topical and cosmetic use," *International Journal of Pharmaceutics*, vol. 188, pp. 233-241 (1999).

Ganan-Calvo, A., "Generation of Steady Liquid Microthreads and MicronSized Monodisperse Sprays in Gas Streams," *Physical Review Letters*, vol. 80, No. 2 (1998).

Ganan-Calvo, A.M., "Perfectly monodisperse micro-bubble production by novel mechanical means. Scaling laws," *American Physical Society 53rd Annual Meeting of the Division of Fluid Dynamics*, Nov. 19-21, 2000.

Ganan-Calvo, A.M., "Perfectly Monodisperse Microbubbling by Capillary Flow Focusing," *Physical Review Letters*, vol. 87, No. 27, pp. 274501-1 to 274501-4 (2001).

Griffiths, A., et al., "Man-made enzymes—from design to in vitro compartmentalisation," *Current Opinion in Biotechnology*, vol. 11, pp. 338-353 (2000).

Hadd, A.G., et al., "Microchip Device for Performing Enzyme Assays," *Anal. Chem.*, vol. 69, pp. 3407-3412 (1997).

Hanes, J., et al., "Degradation of porous poly(anhydride-*co*-imide) microspheres and implication for controlled macromolecule delivery," *Biomaterials*, vol. 19, pp. 163-172 (1998).

Hayward, R.C., et al., "Dewetting Instability during the Formation of Polymersomes from Block-Copolymer-Stabilized Double Emulsions," *Langmuir*, vol. 22, No. 10, pp. 4457-4461 (2006).

Hung, L.H., et al., "Controlled Droplet Fusion in Microfluidic Devices", MicroTAS 2004, Sep. 26-30, Malmo, Sweden.

Hung, L.H., et al., "Optimization of Droplet Generation by controlling PDMS Surface Hydrophobicity," 2004 ASME International Mechanical Engineering Congrees and RD&D Expo, Nov. 13-19, 2004, Anaheim, CA.

Jang, J.H., et al., "Controllable delivery of non-viral DNA from porous scaffold," *Journal of Controlled Release*, vol. 86, pp. 157-168 (2003).

Jo, Y.S., et al, "Encapsulation of Bovine Serum Albumin in Temperature-Programmed "Shell-in-Shell" Structures", *Macromol. Rapid Commun.*, vol. 24, pp. 957-962 (2003).

Kanouni, M., et al., "Preparation of a stable double emulsion (W1/O/W2): role of the interfacial films on the stability of the system", Adv Collid Interf Sci, 99 (2002) 229-254.

Kim, H.K., et al., "Comparative study on sustained release of human growth hormone from semi-crystalline poly(L-lactic acid) and amorphous poly(D,L-lactic-co-glycolic acid) microspheres: morphological effect on protein release," *Journal of Controlled Release*, vol. 98, pp. 115-125 (2004).

Lamprecht, A., et al., "pH-sensitive microsphere delivery increases oral bioavailability of calcitonin," *Journal of Controlled Release*, vol. 98, pp. 1-9 (2004).

Leary, J.F., et al., "Application of Advanced Cytometric and Molecular Technologies to Minimal Residual Disease Monitoring," *Proceedings of SPIE*, vol. 3913, pp. 36-44 (2000).

Lee, D.H., et al., "Effective Formation of Silicone-in-Fluorocarbon-in-Water Double Emulsions: Studies on Droplet Morphology and Stability," *Journal of Dispersion Science and Technology*, vol. 23, No. 4, pp. 491-497 (2002).

Lee, M.H., et al., "Preparation of Silica Particles Encapsulating Retinol Using O/W/O Multiple Emulsions," *Journal of Colloid and Interface Science*, vol. 240, pp. 83-89 (2001).

Lemoff, A.V., et al., "An AC Magnetohydrodynamic Microfluidic Switch for Micro Total Analysis Systems", Biomedical Microdevices, 5(1):55-60, 2003.

Link, D.R., et al., "Geometrically Mediated Breakup of Drops in Microfluidic Devices," *Physical Review Letters*, vol. 92, No. 5 (2004).

Lopez-Herrera, J.M., et al., "Coaxial jets generated from electrified Taylor cones. Scaling laws.," *Aerosol Science*, vol. 34, pp. 535-552 (2003).

Lopez-Herrera, J.M., et al., "One-Dimensional Simulation of the Breakup of Capillary Jets of Conducting Liquids. Application to E.H.D. Spraying," *J. Aerosol. Sci.*, vol. 30, No. 7, pp. 895-912 (1999).

Lopez-Herrera, J.M., et al., "The electrospraying of viscous and non-viscous semi-insulating liquids. Scalilng laws.," *Bulletin of the American Physical Society*, vol. 40, No. 12, pp. 2041 (1995).

Lorenceau, E., et al., "Generation of Polymerosomes from Double-Emulsions," *Langmuir*, vol. 21, pp. 9183-9186 (2005).
Loscertales, I.G., et al., "Micro/Nano Encapsulation via Electrified Coaxial Liquid Jets," *Science*, vol. 295, pp. 1695-1698 (2002).
Lundstrom, Kenneth, et al., "Breakthrough in cancer therapy: Encapsulation of drugs and viruses", www.currentdrugdiscovery.com, Nov. 2002, 19-23.
Marques, F., et al., "Porous Flow within Concentric Cylinders," Bulletin of the American Physical Society Division of Fluid Dynamics, vol. 41, pp. 1768 (1996).
Nakano, M., et al., "Single-molecule PCR using water-in-oil emulsion," *Journal of Biotechnology*, vol. 102, pp. 117-124 (2003).
Molecular Probes, ATP Determination Kit (A-22066) (2003).
Nihant, N., et al., "Polylactide Microparticles Prepared by Double Emulsion/Evaporation Technique. I. Effect of Primary Emulsion Stability," *Pharmaceutical Research*, vol. 11, No. 10, pp. 1479-1484 (1994).
Nof, M., et al., "Drug-releasing scaffolds fabricated from drug-loaded microspheres," *J. Biomed Mater Res*, vol. 59, pp. 349-356, pp. 349-356 (.
Oh, C., et al., "Distribution of Macropores in Silica Particles Prepared by Using Multiple Emulsions," *Journal of colloid and Interface Science*, vol. 254, pp. 79-86 (2002).
Okushima, S., et al,. "Controlled Production of Monodisperse Double Emulsions by Two-Step Droplet Breakup in Microfluidic Devices," *Langmuir*, vol. 20, pp. 9905-9908 (2004).
Ouellette, J., "A New Wave of Microfluidic Device," *The Industrial Physicist*, pp. 14-17, Aug./Sep. 2003.
Piemi, M.P.Y., et al., "Transdermal delivery of glucose through hairless rat skin in vitro: effect of multiple and simple emulsions," *International Journal of Pharamecutics*, vol. 171, pp. 207-215 (1998).
Raghuraman, B., et al., "Emulsion Liquid Membranes for Wastewater Treatment: Equillibrium Models for Some Typical Metal-Extractant Systems," *Environ. Sci. Technol*., vol. 28, pp. 1090-1098 (1994).
Schubert, C., et al., "Designer Capsules," *Nature Medicine*, vol. 8, pp. 1362 (2002).
Silva-Cunha, A., et al., "W/O/W multiple emulsions of insulin containing a protease inhibitor and an absorption enhancer: biological activity after oral administration to normal and diabetic rats," *International Journal of Pharmaceutics*, vol. 169, pp. 33-44 (1998).
Sohn, L.L., et al., "Capacitance cytometry: Measuring biological cells one by one," *PNAS*, vol. 97, No. 20, pp. 10687-10690 (2000).
Song, H., et al., "A Microfluidic System for Controlling Reaction Networks in Time", *Angew Chem. Int Ed*, vol. 42(7), pp. 768-772 (2003).
Takeuchi, S., et al., "An Axisymmetric Flow-Focusing Microfluidic Device," *Adv. Mater*., vol. 17, No. 8, pp. 1067-1072 (2005).
Tan, Y.C., "Microfluidic Liposome Generation from Monodisperse Droplet Emulsion-Towards the Realization of Artificial Cells", Summer Bioengineering Conference, 2003, Florida.
Tan, Y.C., "Monodisperse Droplet Emulsions in Co-Flow Microfluidic Channels", Micro TAS 2003, Lake Tahoe.
Tan, Y.C., et al., "Controlled Fission of Droplet Emulsions in Bifurcating Microfluidic Channels", Transducers 2003, Boston.
Tan, Y.C., et al., "Design of microfluidic channel geometrics for the control of droplet volume, chemical concentration, and sorting", *Lab Chip*, 2004, 4:292-298.
Tawfik, D.S., et al., "Man-made cell-like compartments for molecular evolution," *Nature Biotechnology*, vol. 16, pp. 652-656 (1998).
Terray, A., et al, "Fabrication of linear colloidal structures for microfluidic applications," *Applied Physics Letters*, vol. 81, No. 9, pp. 1555-1557 (2002).
Terray, A., et al., "Microfluidic Control Using Colloidal Devices," *Science*, vol. 296, pp. 1841-1844 (2002).
Thorsen, T., et al., "Dynamic Pattern Formation in a Vesicle-Generating Microfluidic Device," *Physical Review Letters*, vol. 86, No. 18, pp. 4163-4166 (2001).
Umbanhowar, P.B., et al., "Monodisperse Emulsion Generation via Drop Break Off in a Coflowing Stream," *Langmuir*, vol. 16, pp. 347-351 (2000).
Utada, A.S., et al., "Monodisperse Double Emulsions Generated from a Microcapillary Device", *Science*, vol. 308, pp. 537-541 (2005).
Wolff, A., et al., "Integrating advanced functionality in a microfabricated high-throughput fluorescent-activated cell sorter," *Lab Chip*, vol. 3, pp. 22-27 (2003).
Xu, S., et al., "Generation of Monodisperse Particles by Using Microfluidics: Control over Size, Shape and Composition," *Angew. Chem. Int. Ed*., vol. 43, pp. 2-5 (2004).
Yamaguchi, Y., et al., "Insulin-loaded biodegradable PLGA microcapsules: initial burst release controlled by hydrophilic additives," *Journal of Controlled Release*, vol. 81, pp. 235-249 (2002).
Zhang, J.H., et al., "A Simple Statistical Parameter for Use in Evaluation and Validation of High Throughput Screening Assays," *Journal of Biomolecular Screening*, vol. 4, No. 2, pp. 67-73 (1999).
Zheng, B., et al., "A Microfluidic Approach for Screening Submicroliter Volumes against Multiple Reagents by Using Performed Arrays of Nanoliter Plugs in a Three-Phase Liquid/Liquid/Gas Flow," *Angew. Chem. Int. Ed*., vol. 44, pp. 2520-2523 (2005).
International Search Report dated Dec. 20, 2004 in PCT/US2004/010903.
Written Opinion dated Dec. 17, 2004 in PCT/US2004/010903.
International Preliminary Report Oct. 14, 2005 in PCT/US2004/010903.
International Search Report dated Feb. 6, 2004 in PCT/US2003/20542.
International Preliminary Report dated Feb. 27, 2006 in PCT/US2004/027912.
Written Opinion dated Jan. 26, 2005 in PCT/US2004/027912.
International Search Report dated May 31, 2006 in PCT/US2006/001938.
Written Opinion dated May 31, 2006 in PCT/US2006/001938.
International Search Report dated Jun. 16, 2006 in PCT/US2006/007772.
Written Opinion dated Jun. 16, 2006 in PCT/US2006/007772.
Griffiths, A.D. et al., "Miniaturising the laboratory in emulsion droplets," *Trend Biotech*, 12:1-8, 2006.
Nisisako, T. et al., "Controlled formulation of monodisperse double emulsions in a multiple-phase microfluidic system," *Soft Matter*, 2005, 1, 23-27.
International Search Report dated Jan. 9, 2006 in PCT/US06/007772.
Written Opinion dated Jan. 9, 2006 in PCT/US06/007772.
Grasland-Mongrain, et al., "Droplet coalescence in microfluidic devices," Jan.-Jul. 2003, pp. 1-30.
International Search Report dated Sep. 10, 2007 in PCT/US2007/002063.
International Search Report dated Jul. 29, 2008 in PCT/US2007/002063.
Office Action from U.S. Appl. No. 11/246,911 dated Nov. 8, 2007.
Office Action from U.S. Appl. No. 11/246,911 dated Jun. 3, 2008.
Office Action from U.S. Appl. No. 11/246,911 dated Dec. 18, 2008.
Office Action from U.S. Appl. No. 11/368,263 dated Dec. 19, 2008.
Priest, C. et al. "Generation of Monodisperse Gel Emulsions in a Microfluidic Device" Applied Physics Letters 88, 024106 (2006).
Office Action dated Apr. 2, 2009 for U.S. Appl. No. 11/360,845.
Web Page: Experimental Soft Condensed Matter Group: Cool Picture of the Moment, *Harvard University*, Prof. D.A. Weitz.
Zimmerman et al. "Microscale production of hybridomas by hypo-osmolar electrofusion," *Hum. Antibod. Hybridomas*, vol. 3 (Jan. 1992).

* cited by examiner

METHOD AND APPARATUS FOR FLUID DISPERSION

RELATED APPLICATIONS

This application is a continuation of PCT/US03/20542, filed Jun. 30, 2003, which was published in English and designates the United States and which claims the benefit under Title 35, U.S.C. §119(e) of U.S. provisional application No. 60/392,195, filed Jun. 28, 2002, and of U.S. provisional application No. 60/424,042, filed Nov. 5, 2002. Each of these documents is incorporated herein by reference.

GOVERNMENTAL SUPPORT

This invention was made with government support under the National Institutes of Health Grant Number GM065364, Department of Energy Grant Number DE-FG02-00ER45852, and National Science Foundation Grant Number ECS-0004030. The government has certain rights in the invention.

FIELD OF THE INVENTION

The present invention relates generally to flow-focusing-type technology, and also to microfluidics, and more particularly the invention relates to microfluidic systems arranged to control a dispersed phase within a dispersant, and the size, and size distribution, of a dispersed phase in a multi-phase fluid system.

BACKGROUND OF THE INVENTION

The manipulation of fluids to form fluid streams of desired configuration, discontinuous fluid streams, particles, dispersions, etc., for purposes of fluid delivery, product manufacture, analysis, and the like, is a relatively well-studied art. For example, highly monodisperse gas bubbles, less than 100 microns in diameter, have been produced using a technique referred to as capillary flow focusing. In this technique, gas is forced out of a capillary tube into a bath of liquid, the tube is positioned above a small orifice, and the contraction flow of the external liquid through this orifice focuses the gas into a thin jet which subsequently breaks into equal-sized bubbles via a capillary instability. In a related technique, a similar arrangement was used to produce liquid droplets in air Microfluidics is an area of technology involving the control of fluid flow at a very small scale. Microfluidic devices typically include very small channels, within which fluid flows, which can be branched or otherwise arranged to allow fluids to be combined with each other, to divert fluids to different locations, to cause laminar flow between fluids, to dilute fluids, and the like. Significant effort has been directed toward "lab-on-a-chip" microfluidic technology, in which researchers seek to carry out known chemical or biological reactions on a very small scale on a "chip," or microfluidic device. Additionally, new techniques, not necessarily known on the macro scale, are being developed using microfluidics. Examples of techniques being investigated or developed at the microfluidic scale include high-throughput screening, drug delivery, chemical kinetics measurements, combinatorial chemistry (where rapid testing of chemical reactions, chemical affinity, and micro structure formation are desired), as well as the study of fundamental questions in the fields of physics, chemistry, and engineering.

The field of dispersions is well-studied. A dispersion (or emulsion) is a mixture of two materials, typically fluids, defined by a mixture of at least two incompatible (immiscible) materials, one dispersed within the other. That is, one material is broken up into small, isolated regions, or droplets, surrounded by another phase (dispersant, or constant phase), within which the first phase is carried. Examples of dispersions can be found in many industries including the food and cosmetic industry. For example, lotions tend to be oils dispersed within a water-based dispersant. In dispersions, control of the size of droplets of dispersed phase can effect overall product properties, for example, the "feel" of a lotion.

Formation of dispersions typically is carried out in equipment including moving parts (e.g., a blender or device similarly designed to break up material), which can be prone to failure and, in many cases, is not suitable for control of very small dispersed phase droplets. Specifically, traditional industrial processes typically involve manufacturing equipment built to operate on size scales generally unsuitable for precise, small dispersion control. Membrane emulsification is one small scale technique using micron-sized pores to form emulsions. However, polydispersity of the dispersed phase can in some cases be limited by the pore sizes of the membrane.

While many techniques involving control of multi-phase systems exists, there is a need for improvement in control of size of dispersed phase, size range (polydispersity), and other factors.

An article entitled "Generation of Steady Liquid Microthreads and Micron-Sized Monodisperse Sprays and Gas Streams," *Phys. Rev. Lett.,* 80:2, Jan. 12, 1998, 285-288 (Ganan-Calvo) describes formation of a microscopic liquid thread by a laminar accelerating gas stream, giving rise to a fine spray.

U.S. Pat. No. 6,120,666, issued Sep. 19, 2000, describes a micofabricated device having a fluid focusing chamber for spatially confining first and second sample fluid streams for analyzing microscopic particles in a fluid medium, for example in biological fluid analysis.

U.S. Pat. No. 6,116,516, issued Sep. 12, 2000, describes formation of a capillary microjet, and formation of a monodisperse aerosol via disassociation of the microjet.

U.S. Pat. No. 6,187,214, issued Feb. 13, 2001, describes atomized particles in a size range of from about 1 to about 5 microns, produced by the interaction of two immiscible fluids.

U.S. Pat. No. 6,248,378, issued Jun. 19, 2001, describes production of particles for introduction into food using a microjet and a monodisperse aerosol formed when the microjet dissociates.

An articled entitled "Dynamic Pattern Formation in a Vesicle-Generating Microfluidic Device," *Phys. Rev. Lett.,* 86:18, Apr. 30, 2001 (Thorsen, et al.) describes formation of a discontinuous water phase in a continuous oil phase via microfluidic cross-flow, specifically, by introducing water, at a "T" junction between two microfluidic channels, into flowing oil.

Microfluidic systems have been described in a variety of contexts, typically in the context of miniaturized laboratory (e.g., clinical) analysis. Other uses have been described as well. For example, International Patent Publication No. WO 01/89789, published Nov. 29, 2001 by Anderson, et al., describes multi-level microfluidic systems that can be used to provide patterns of materials, such as biological materials and cells, on surfaces. Other publications describe microfluidic systems including valves, switches, and other components.

While the production of discontinuous fluids, aerosols, and the like are known, very little is known about discontinuous fluid production in microfluidic systems, i.e. the production of liquid-liquid and gas-liquid dispersions and emulsions. This may be due to the fact that precise control of fluid flow in microfluidic systems can be challenging.

SUMMARY OF THE INVENTION

The present invention involves a series of devices, systems, and techniques for manipulations of fluids. In one aspect, the invention provides a series of methods. One method of the invention involves providing a microfluidic interconnected region having an upstream portion and a downstream portion connecting to an outlet, and creating discontinuous sections of a subject fluid in the interconnected region upstream of the outlet, at least some of the discontinuous sections having a maximum dimension of less than 20 microns.

Another embodiment involves providing a microfluidic interconnected region having an upstream portion and a downstream portion connecting to an outlet, introducing a subject fluid into an interior portion of the interconnected region, and creating discontinuous sections of the subject fluid in the interconnected region.

In another embodiment, a method involves joining a flow of subject fluid with a dispersing fluid that does not completely axially surround the flow of subject fluid, and creating discontinuous sections of the subject fluid at least in part by action of the dispersing fluid.

Another method of the invention involves focusing the flow of a subject fluid by exposing the subject fluid to two separate streams of a second fluid, and allowing the two separate streams to join and to completely circumferentially surround the subject fluid stream.

In another embodiment, the invention involves passing a flow of a subject fluid and a dispersing fluid through a dimensionally-restricted section, having a mean cross-sectional dimension, that is dimensionally restricted relative to a channel that delivers either the subject fluid or the dispersing fluid to the dimensionally-restricted section, and creating a subject fluid stream or discontinuous portions of subject fluid stream having a mean cross-sectional dimension or mean diameter, respectively, no smaller than the mean cross-sectional dimension of the dimensionally-restricted section.

In another embodiment, the invention involves forming at least portions of both a subject fluid channel and a focusing fluid channel of a flow focusing device from a single material.

In another embodiment, the invention involves forming at least portions of both a subject fluid channel and a focusing fluid channel of a flow focusing device in a single molding step.

In another aspect, the invention involves a series of systems. One system of the invention includes a microfluidic interconnected region, and a subject fluid microfluidic channel surrounded at least in part by the microfluidic interconnected region.

In another embodiment, a system of the invention includes a microfluidic interconnected region having an upstream portion and a downstream portion connecting to an outlet, and a non-valved, dimensionally-restricted section upstream of the outlet.

A device of the invention includes an interconnected region for carrying a focusing fluid, and a subject fluid channel for carrying a fluid to be focused by the focusing fluid surrounded at least in part by the interconnected region, wherein at least a portion defining an outer wall of the interconnected region and a portion defining an outer wall of the subject fluid channel are portions of a single integral unit.

According to another embodiment, a flow focusing device includes a fluid channel for carrying a fluid to be focused by the device, and at least two, separate, focusing fluid channels for simultaneously delivering focusing fluid to and focusing the subject fluid.

In another aspect, the present invention provides devices and methods involving breakup of dispersed fluids into smaller parts. In most specific embodiments of the invention, a dispersion of discrete, isolated portions of one fluid within another incompatible fluid is further broken up by either being urged against an obstruction in a confined channel, or diverged into at least two different channels at a channel junction.

In one embodiment, a method involves urging discontinuous sections of a fluid, within a confined channel, against an obstruction and causing the obstruction to separate at least some of the discontinuous sections into further-dispersed sections.

In another embodiment, a method of the invention involves separating at least one discontinuous section of a fluid into further-dispersed sections by separating the sections into at least two separate channels at a channel junction of a fluidic system. In another embodiment a method of the invention involves flowing a dispersed phase and a dispersant within a channel intersection and, at the channel intersection, further dispersing the dispersed phase into at least two further-dispersed phases each having an average size, wherein the average sizes of the at least two further-dispersed phases are set by at least two different backpressures experienced by the dispersed phase at the channel intersection.

In another aspect the invention provides a series of devices. One device of the invention includes a confined channel having an inlet connectable to a source of a first fluid and a second fluid incompatible with the first fluid, an outlet connectable to a reservoir for receiving a dispersed phase of the first fluid in the second fluid, and an obstruction within the confined channel between the inlet and the outlet.

The subject matter of this application may involve, in some cases, interrelated products, alternative solutions to a particular problem, and/or a plurality of different uses of a single system or article.

Other advantages, features, and uses of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

DETAILED DESCRIPTION OF THE INVENTION

Figure 1:
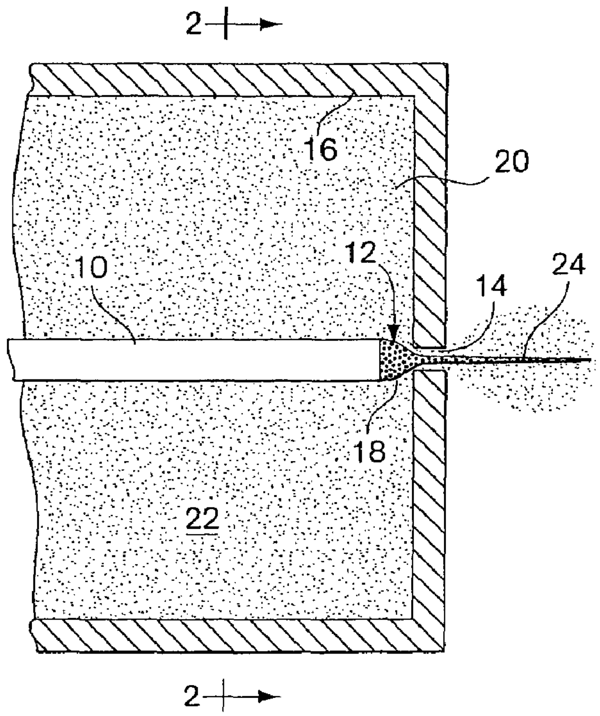
Fig. 1 (prior art)
FIG. 1 is schematic representation of a prior art flow-focusing arrangement.

The following documents are incorporated herein by reference in their entirety: U.S. Pat. No. 5,512,131, issued Apr. 30, 1996 to Kumar, et al.; International Patent Publication WO 96/29629, published Jun. 26, 1996 by Whitesides, et al.; U.S. Pat. No. 6,355,198, issued Mar. 12, 2002 to Kim, et al.; and International Patent Publication WO 01/89787, published Nov. 29, 2001 to Anderson, et al. The present invention provides microfluidic techniques for causing interactions of and between fluids, in particular the formation of discontinuous portions of a fluid, e.g. the production of dispersions and emulsions. The invention differs in several ways from most known techniques for formation of disperse fluids.

The present invention in part involves appreciation for a need in many areas of technology for improvement in dispersion formation and/or control, and for applications of improved dispersions. Improvement in dispersion formation in accordance with the invention can find application in accurate delivery of, e.g., small fluid volumes (nanoliter, picoliter, and even femtoliter or smaller quantities) for a variety of uses. For example, one possible route for the systematic delivery of small fluid volumes is to form liquid drops of controlled size, which may serve as convenient transporters of a specific chemical or may themselves be small chemical reactors. Since a droplet containing one picoliter of volume has a radius of under 10 microns, the controlled formation of very small droplets is very important. Specified volumes of more than one size can also be provided by the invention, for example in order to precisely control the stoichiometry of different chemical reactants. That is, in a lab-on-a-chip device where delivery of reactants at specified quantities to various locations is required, this can be achieved by controlling the drop size of a fluid reactant and then controlling its delivery route through the device. This can be achieved in accordance with the invention. While to some degree control of drop size and drop size range in dispersions exists, the present invention provides techniques for achieving better control of small fluid drop size and/or improved techniques for achieving control. The invention provides the ability to easily and reproducibly control fluid drop size and size range, and divert fluid drops of one size or size range to one location and drops of another size or size range to another location.

Specifically, the present invention involves devices and techniques associated with manipulation of multiphase materials. While those of ordinary skill will recognize that any of a wide variety of materials including various numbers of phases can be manipulated in accordance with the invention, the invention finds use, most generally, with two-phase systems of incompatible fluids. A "fluid," as used herein, means any substance which can be urged to flow through devices described below to achieve the benefits of the invention. Those of ordinary skill in the art will recognize which fluids have viscosity appropriate for use in accordance with the invention, i.e., which substances are "fluids." It should be appreciated that a substance may be a fluid, for purposes of the invention, under one set of conditions but may, under other conditions, have viscosity too high for use as a fluid in the invention. Where the material or materials behave as fluids under at least one set of conditions compatible with the invention, they are included as potential materials for manipulation via the present invention.

In one set of embodiments, the present invention involves formation of drops of a dispersed phase within a dispersant, of controlled size and size distribution, in a flow system (preferably a microfluidic system) free of moving parts to create drop formation. That is, at the location or locations at which drops of desired size are formed, the device is free of components that move relative to the device as a whole to affect drop formation or size. For example, where drops of controlled size are formed, they are formed without parts that move relative to other parts of the device that define a channel within the drops flow. This can be referred to as "passive control" of drop size, or "passive breakup" where a first set of drops are broken up into smaller drops. The following definitions will assist in understanding certain aspects of the invention. Also included, within the list of definitions, are sets of parameters within which certain embodiments of the invention fall.

"Channel", as used herein, means a feature on or in an article (substrate) that can at least partially confine and direct the flow of a fluid, and that has an aspect ratio (length to average cross sectional dimension) of at least 2:1, more typically at least 3:1, 5:1, or 10:1. The feature can be a groove or other indentation of any cross-sectional shape (curved, square or rectangular) and can be covered or uncovered. In embodiments where it is completely covered, at least one portion of the channel can have a cross-section that is completely enclosed, or the entire channel may be completely enclosed along its entire length with the exception of its inlet and outlet. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. The fluid within the channel may partially or completely fill the channel. In some cases where an open channel is used, the fluid may be held within the channel, for example, using surface tension (i.e., a concave or convex meniscus). The channel may be of any size, for example, having a largest dimension perpendicular to fluid flow of less than about 5 or 2 millimeters, or less than about 1 millimeter, or less than about 500 microns, less than about 200 microns, less than about 100 microns, or less than about 50 or 25 microns. In some cases the dimensions of the channel may be chosen such that fluid is able to freely flow through the reactor. The dimensions of the channel may also be chosen, for example, to allow a certain volumetric or linear flowrate of fluid in the channel. Of course, the number of channels and the shape of the channels can be varied by any method known to those of ordinary skill in the art. In the embodiments illustrated in the accompanying figures, all channels are completely enclosed. “Channel”, as used herein, does not include a space created between a channel wall and an obstruction. Instead, obstructions, as defined herein, are understood to be contained within channels. Larger channels, tubes, etc. can be used in microfluidic device for a variety of purposes, e.g., to store fluids in bulk and to deliver fluids to components of the invention.

Different components can be fabricated of different materials. For example, a base portion of a microfluidic device, indulging a bottom wall and side walls, can be fabricated from an opaque material such as silicon or PDMS, and a top portion, or cover, can be fabricated from a transparent material such as glass or a transparent polymer for observation and control of the fluidic process. Components can be coated so as to expose a desired chemical functionality to fluids that contact interior channel walls, where base supporting material does not have the precise, desired functionality. For example, components can be fabricated as illustrated, with interior channel walls coated with another material.

FIG. 1 is a partial cross-sectional schematic representation of a typical prior art “flow focusing” technique for reducing the size of a fluid stream and, alternatively, forming droplets of a first fluid separated by a second. In the arrangement of FIG. 1 a tube 10 has an outlet 12 positioned upstream of and directed toward a small orifice 14 formed in a wall of a container 16 within which tube 10 is housed. A first fluid 18 flows through tube 10 and exits fluid 10 at outlet 12. A second fluid 20 is contained within the interior 22 of housing 16 at an elevated pressure relative to the pressure outside of housing 16. Due to this pressure differential, fluid 20 escapes housing 16 through orifice 14, and fluid 18 elongates toward and is drawn through orifice 14 by the action of fluid 20. A steady thin liquid jet 24 of fluid 18 results, and can break up into discontinuous sections. This technique, commonly known as “flow focusing,” has been described for a variety of uses including fuel injection, production of food particles, production of pharmaceuticals, and the like.

Figure 2:
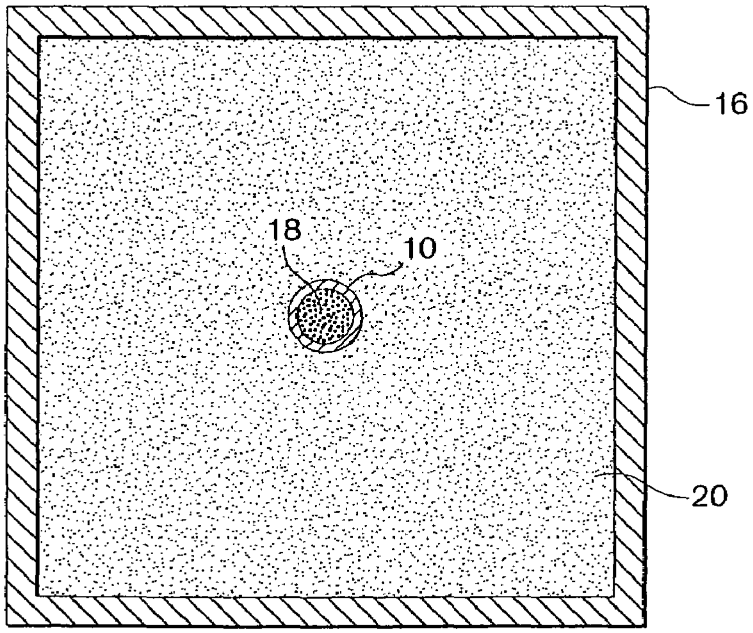
Fig. 2 (prior art)
FIG. 2 is schematic cross-sectional view through line 2-2 of FIG. 1.

FIG. 2 is cross-sectional illustration through line 2-2 of FIG. 1, showing housing 16 and tube 10. Housing 16 is typically arranged to completely surround tube 10, such that fluid 20 completely surrounds fluid 18 upon the exit of fluid 18 from the outlet of tube 10. The arrangement of FIGS. 1 and 2 is made from multiple parts, typically requires relatively complex, multi-step fabrication, relative to construction of the devices of the present invention, and is typically much larger in overall scale.

Figure 3:
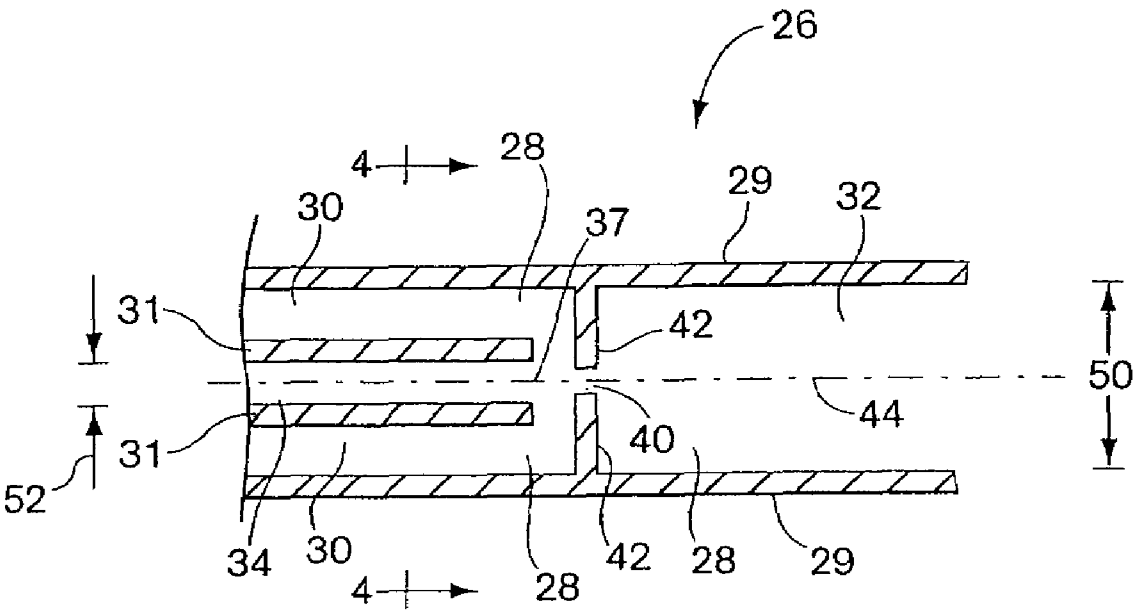
FIG. 3 is a schematic illustration of a microfluidic device of the invention.
Figure 4:
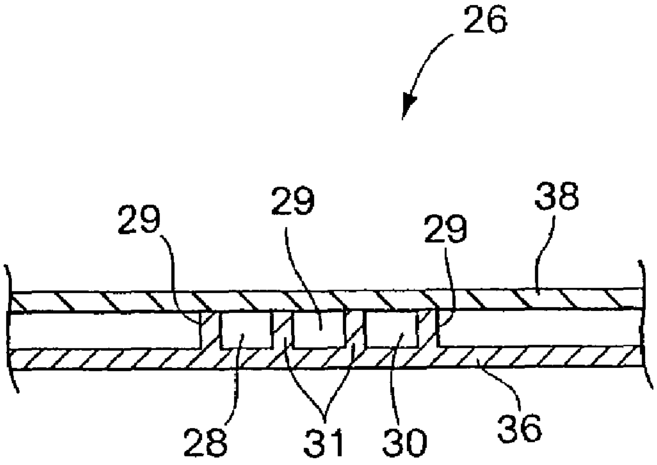
FIG. 4 is a schematic cross-sectional view through line 4-4 of FIG. 3.

Referring now to FIG. 3, one embodiment of the present invention, in the form of a microfluidic system 26, is illustrated schematically in cross-section (although it will be understood that a top view of system 26, absent top wall 38 of FIG. 4, would appear similar). Although “top” and “bottom” are used to define certain portions and perspectives of systems of the invention, it is to be understood that the systems can be used in orientations different from those described. For reference, it is noted that the system is designed such that fluid flows optimally from left to right per the orientation of FIG. 3.

System 26 includes a series of walls defining regions of the microfluidic system via which the system will be described. A microfluidic interconnected region 28 is defined in the system by walls 29, and includes an upstream portion 30 and a downstream portion 32, connected to an outlet further downstream which is not shown in FIG. 3. In the embodiment illustrated in FIG. 3, a subject fluid channel 34, defined by side walls 31, is provided within the outer boundaries of interconnected region 28. Subject fluid channel 34 has an outlet 37 between upstream portion 30 and downstream portion 32 of interconnected region 28. The system is thus arranged to deliver a subject fluid from channel 34 into the interconnected region between the upstream portion and the downstream portion.

FIG. 4, a cross-sectional illustration through line 4-4 of FIG. 3 shows (in addition to some of the components shown in FIG. 3—walls 29 and 31) a bottom wall 36 and a top wall 38 which, together with walls 29 and 31, defining continuous region 28 (at upstream portion 30 thereof) and subject fluid channel 34. It can be seen that interconnected region 28, at upstream portion 30, includes two separate sections, separated by subject fluid channel 34. The separate sections are interconnected further downstream.

Referring again to FIG. 3, interconnected region 28 includes a dimensionally-restricted section 40 formed by extensions 42 extending from side walls 29 into the interconnected region. Fluid flowing from upstream portion 30 to downstream portion 32 of the interconnected region must pass through dimensionally-restricted section 40 in the embodiment illustrated. Outlet 37 of subject fluid channel 34 is positioned upstream of the dimensionally-restricted section. In the embodiment illustrated, the downstream portion of interconnected region 28 has a central axis 44, which is the same as the central axis of subject fluid channel 34. That is, the subject fluid channel is positioned to release subject fluid upstream of the dimensionally-restricted section, and in line with the dimensionally-restricted section. As arranged as shown in FIG. 3, subject fluid channel 34 releases subject fluid into an interior portion of interconnected region 28. That is, the outer boundaries of the interconnected region are exterior of the outer boundaries of the subject fluid channel. At the precise point at which fluid flowing downstream in the interconnected region meets fluid released from the subject fluid channel, the subject fluid is surrounded at least in part by the fluid in the interconnected region, but is not completely surrounded by fluid in the interconnected region. Instead, it is surrounded through approximately 50% of its circumference, in the embodiment illustrated. Portions of the circumference of the subject fluid are constrained by bottom wall 36 and top wall 38.

In the embodiments illustrated, the dimensionally-restricted section is an annular orifice, but it can take any of a varieties of forms. For example, it can be elongate, ovoid, square, or the like. Preferably, it is shaped in any way that causes the dispersing fluid to surround and constrict the cross-sectional shape of the subject fluid. The dimensionally-restricted section is non-valved in preferred embodiments. That is, it is an orifice that cannot be switched between an open state and a closed state, and typically is of fixed size.

Although not shown in FIGS. 3 and 4, one or more intermediate fluid channels can be provided in the arrangement of FIGS. 3 and 4 to provide an encapsulating fluid surrounding discontinuous portions of subject fluid produced by action of the dispersing fluid on the subject fluid. In one embodiment, two intermediate fluid channels are provided, one on each side of subject fluid channel 34, each with an outlet near the outlet of the subject fluid channel.

In some, but not all embodiments, all components of system 26 are microfluidic. “Microfluidic”, as used herein, refers to a device, apparatus or system including at least one fluid channel having a cross-sectional dimension of less than 1 millimeter (mm), and a ratio of length to largest cross-sectional dimension of at least 3:1, and "Microfluidic channel" is a channel meeting these criteria. Cross-sectional dimension is measured perpendicular to the direction of fluid flow. Most fluid channels in components of the invention have maximum cross-sectional dimensions less than 2 millimeters, and preferably 1 millimeter. In one set of embodiments, all fluid channels, at least at regions at which one fluid is dispersed by another, are microfluidic or of largest cross sectional dimension of no more than 2 millimeters. In another embodiment, all fluid channels associated with fluid dispersion, formed in part by a single component (e.g. an etched substrate or molded unit) are microfluidic or of maximum dimension of 2 millimeters. Of course, larger channels, tubes, etc. can be used to store fluids in bulk and to deliver fluids to components of the invention.

A "microfluidic interconnected region," as used herein, refers to a portion of a device, apparatus or system including two or more microfluidic channels in fluid communication.

In one set of embodiments, the maximum cross-sectional dimension of all active fluid channels, that is, all channels that participate in fluid dispersion, is less than 500 microns or 200, 100, 50, or 25 microns. For example, cross-section 50 of interconnected region 28, as well as the maximum cross-sectional dimension 52 of subject fluid channel 34, can be less than any of these dimensions. Upstream sections 30 of interconnected region 28 can be defined by any of these maximum cross-sectional boundaries as well. Devices and systems may include channels having non-microfluidic portions as well.

"Channel", as used herein, means a feature on or in an article (substrate) that at least partially directs the flow of a fluid. The feature can be a groove of any cross-sectional shape (curved, square or rectangular as illustrated in the figures, or the like) and can be covered or uncovered. In embodiments where it is completely covered, at least one portion of the channel can have a cross-section that is completely enclosed, or the entire channel may be completely enclosed along its entire length with the exception of its inlet and outlet. Unless otherwise indicated, in the embodiments illustrated in the accompanying figures, all channels are completely enclosed.

One aspect of the invention involves simplified fabrication of microfluidic fluid-combining systems, and resulting systems defined by fewer components than typical prior art systems. For example, in the arrangement illustrated in FIGS. 3 and 4, bottom portion 36 and walls 29 and 31 are integral with each other. "Integral", as used herein, means that the portions are joined in such a way that they cannot be separated from each other without cutting or breaking the components from each other. As illustrated, bottom portion 36 and walls 31 and 29 are formed from a single piece of material. Top portion 38, which defines the upper wall of interconnected region 28 and subject fluid channel 34 in the embodiment illustrated, can be formed of the same material of bottom wall 36 and walls 31 and 29, or a different material. In one embodiment, at least some of the components described above are transparent so that fluid flow can be observed. For example, top wall 38 can be a transparent material, such as glass.

A variety of materials and methods can be used to form components of system 26. In some cases various materials selected lend themselves to various methods. For example, components of the invention can be formed from solid materials, in which the channels can be formed via micromachining, film deposition processes such as spin coating and chemical vapor deposition, laser fabrication, photolithographic techniques, etching methods including wet chemical or plasma processes, and the like. See, for example, Angell, et al., *Scientific American* 248:44-55 (1983). In one embodiment, at least a portion of the system (for example, bottom wall 36 and walls 29 and 31) is formed of silicon by etching features in a silicon chip. Technology for precise and efficient fabrication of devices of the invention from silicon is known. In another embodiment, the section (or other sections) can be formed of a polymer, and can be an elastomeric polymer, or polytetrafluoroethylene (PTFE; Teflon®), or the like.

Different components can be fabricated of different materials. For example, a base portion including bottom wall 36 and side walls 29 and 34 can be fabricated from an opaque material such as silicon or PDMS, and top portion 38 can be fabricated from a transparent material such as glass or a transparent polymer, for observation and control of the fluidic process. Components can be coated so as to expose a desired chemical functionality to fluids that contact interior channel walls, where base supporting material does not have the precise, desired functionality. For example, components can be fabricated as illustrated, with interior channel walls coated with another material.

Material used to fabricate devices of the invention, or material used to coat interior walls of fluid channels, may desirably be selected from among those materials that will not adversely affect or be affected by fluid flowing through the device, e.g., material(s) that is chemically inert in the presence of fluids at working temperatures and pressures that are to be used within the device.

In one embodiment, components of the invention are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid art that can be induced to solidify, or that spontaneously solidifies, into a solid capable of containing and transporting fluids contemplated for use in and with the microfluidic network structures. In one embodiment, the hardenable fluid comprises a polymeric liquid or a liquid polymeric precursor (i.e. a "prepolymer"). Suitable polymeric liquids can include, for example, thermoplastic polymers, thermoset polymers, or mixture of such polymers heated above their melting point; or a solution of one or more polymers in a suitable solvent, which solution forms a solid polymeric material upon removal of the solvent, for example, by evaporation. Such polymeric materials, which can be solidified from, for example, a melt state, by solvent evaporation or by catalysis, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac™ polymers. Examples of silicone elastomers suitable for use according to the invention include those formed from precursors including the chlorosilanes such as methylchlorosilanes, ethylchlorosilanes, and phenylchlorosilanes, and the like.

Silicone polymers are preferred in one set of embodiments, for example, the silicone elastomer polydimethylsiloxane (PDMS). Exemplary polydimethylsiloxane polymers include those sold under the trademark Sylgard® by Dow Chemical Co., Midland, Mich., and particularly Sylgard 182, Sylgard 184, and Sylgard 186. Silicone polymers including PDMS have several beneficial properties simplifying fabrication of the microfluidic structures of the invention. First, such materials are inexpensive, readily available, and can be solidified from a prepolymeric liquid via curing with heat. For example, PDMSs are typically curable by exposure of the prepolymeric liquid to temperatures of about, for example, 65° C. to about 75° C. for exposure times of about, for example, 1 hour. Second, silicone polymers, such as PDMS, are elastomeric and are thus useful for forming very small features with relatively high aspect ratios, necessary in certain embodiments of the invention. Flexible (e.g. elastomeric) molds or masters can be advantageous in this regard.

Another advantage of forming microfluidic structures of the invention from silicone polymers, such as PDMS, is the ability of such polymers to be oxidized, for example by exposure to an oxygen-containing plasma such as an air plasma, so that the oxidized structures contain at their surface chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in Duffy et al., *Rapid Prototyping of Microfluidic Systems and Polydimethylsiloxane*, Analytical Chemistry, Vol. 70, pages 474-480, 1998, incorporated herein by reference.

Another advantage to forming microfluidic structures of the invention (or interior, fluid-contacting surfaces) from oxidized silicone polymers is that these surfaces can be much more hydrophilic than the surfaces of typical elastomeric polymers (where a hydrophilic interior surface is desired). Such hydrophilic channel surfaces can thus be more easily filled and wetted with aqueous solutions than can structures comprised of typical, unoxidized elastomeric polymers or other hydrophobic materials. Thus, devices of the invention can be made with surfaces that are more hydrophilic than unoxididized elastomeric polymers.

In one embodiment, bottom wall 36 is formed of a material different from one or more of walls 29 or 31, or top wall 38, or other components. For example, the interior surface of bottom wall 36 can comprise the surface of a silicon wafer or microchip, or other substrate. Other components can, as described above, be sealed to such alternative substrates. Where it is desired to seal a component comprising a silicone polymer (e.g. PDMS) to a substrate (bottom wall) of different material, it is preferred that the substrate be selected from the group of materials to which oxidized silicone polymer is able to irreversibly seal (e.g., glass, silicon, silicon oxide, quartz, silicon nitride, polyethylene, polystyrene, epoxy polymers, and glassy carbon surfaces which have been oxidized). Alternatively, other sealing techniques can be used, as would be apparent to those of ordinary skill in the art, including, but not limited to, the use of separate adhesives, thermal bonding, solvent bonding, ultrasonic welding, etc.

The invention provides for formation of discontinuous, or isolated, regions of a subject fluid in a dispersing fluid, with these fluids optionally separated by one or more intermediate fluids. These fluids can be selected among essentially any fluids (liquids, gases, and the like) by those of ordinary skill in the art, by considering the relationship between the fluids. For example, the subject fluid and the dispersing fluid are selected to be immiscible within the time frame of formation of the dispersed portions. Where the dispersed portions remain liquid for a significant period of time, the fluids should be significantly immiscible. Where, after formation of dispersed portions, the dispersed portions are quickly hardened by polymerization or the like, the fluids need not be as immiscible. Those of ordinary skill in the art can select suitable immiscible fluids, using contact angle measurements or the like, to carry out the techniques of the invention.

Subject fluid dispersion can be controlled by those of ordinary skill in the art, based on the teachings herein, as well as available teachings in the field of flow-focusing. Reference can be made, for example, to "Generation of Steady Liquid Microthreads and Micron-Sized Monodispersed Sprays and Gas Streams," *Phys. Rev. Lett.,* 80:2, Jan. 12, 1998, Ganan-Calvo, as well as numerous other texts, for selection of fluids to carry out the purposes of the invention. As will be more fully appreciated from the examples below, control of dispersing fluid flow rate, and ratio between the flow rates of dispersing and subject fluids, can be used to control subject fluid stream and/or dispersion size, and monodispersity versus polydispersity in fluid dispersions. The microfluidic devices of the present invention, coupled with flow rate and ratio control as taught herein, allow significantly improved control and range. The size of the dispersed portion can range down to less than one micron in diameter.

Many dispersions have bulk properties (e.g. rheology; how the dispersion(s) flows, and optionally other properties such as optical properties, taste, feel, etc., influenced by the dispersion size and the dispersion size distribution. Typical prior art techniques, such as prior art flow focusing techniques, most commonly involve monodisperse systems. The present invention also involves control of conditions that bidisperse and polydisperse discontinuous section distributions result, and this can be useful when influencing the bulk properties by altering the discontinuous size distribution, etc.

The invention can be used to form a variety of dispersed fluid sections or particles for use in medicine (e.g., pharmaceuticals), skin care products (e.g. lotions, shower gels), foods (e.g. salad dressings, ice cream), ink encapsulation, paint, micro-templating of micro-engineered materials (e.g., photonic crystals, smart materials, etc.), foams, and the like. Highly monodisperse and concentrated liquid crystal droplets produced according to the invention can self-organize into two and three dimensional structures, and these can be used in, for example, novel optical devices.

One advantage of the present invention is increased control over size of discontinuous portions of subject fluid. This is in contrast to many prior art techniques in which, typically, an inner fluid is drawn into a stream or set of drops of size smaller than an orifice through which the fluid is forced. In the present invention, some embodiments involve formation of a subject fluid stream and/or discontinuous portions having a mean cross-sectional dimension or mean diameter, respectively, no smaller than the mean cross-sectional dimension of the dimensionally-restricted section. The invention involves control over these mean cross-sectional dimensions or diameters by control of the flow rate of the dispersing fluid, subject fluid, or both, and/or control of the ratios of these flow rates, alternatively in conjunction with the microfluidic environment. In other embodiments, the subject fluid stream and/or discontinuous portions have a mean cross-sectional dimension or mean diameter, respectively, no smaller than 90% of the mean cross-sectional dimension of the dimensionally-restricted section, or in other embodiments no smaller than 80%, 70%, 60%, 50%, 40%, or 30% of the mean cross-sectional dimension of the dimensionally-restricted section. This can be advantageous in that the system of the invention can operate over a range of flow rates and produce essentially the same stream or discontinuous section size at those varying flow rates (the size being set, e.g., by the dimension of the dimensionally-restricted section) up to a threshold flow rate, at which point increasing the flow rate causes a corresponding decrease in subject fluid stream and/or discontinuous portion mean cross-sectional dimension or mean diameter, respectively.

In some embodiments, a gas-liquid dispersion may be formed to create a foam. As the volume percent of a gas in a gas-liquid dispersion increases, individual gas bubbles may lose their spherical shape as they are forced against each other. If constrained by one or more surfaces, these spheres may be compressed to disks, but will typically maintain a circular shape pattern when viewed through the compressing surface. Typically, a dispersion is called a foam when the gas bubbles become non-spherical, or polygonal, at higher volume percentages. Although many factors, for example, dispersion size, viscosity, and surface tension may affect when a foam is formed, in some embodiments, foams form (non-spherical bubbles) when the volume percent of gas in the gas-liquid dispersion exceeds, for example, 75, 80, 85, 90 or 95.

Formation of initial, subject fluid droplets (or dispersed phases), which can be broken up into smaller droplets in accordance with some aspects of the invention, will be described. It is to be understood that essentially any technique, including those described herein, for forming subject fluid droplets can be employed. One technique for forming subject fluid droplets can be done using a device such as that shown in FIG. 1. FIG. 1 is a partial cross-sectional schematic representation of a typical prior art "flow focusing" technique for reducing the size of a fluid stream and, alternatively, forming droplets of a first fluid separated by a second. The arrangement is described above.

Another technique for subject fluid droplet formation is by employing the device of FIG. 3 that is described herein. FIG. 3 shows a microfluidic system 26, illustrated schematically in cross-section (although it will be understood that a top view of system 26, absent a top wall, would appear similar). Although "top" and "bottom" are used to define certain portions and perspectives of systems of the invention, it is to be understood that the systems can be used in orientations different from those described. For reference, it is noted that the system is designed such that fluid flows optimally from left to right per the orientation of FIG. 3. System 26 includes a series of walls defining regions of the microfluidic system via which the system will be described. A microfluidic interconnected region 28 is defined in the system by walls 29, and includes an upstream portion 30 and a downstream portion 32, connected to an outlet further downstream which is not shown in FIG. 3. In the embodiment illustrated in FIG. 3, a subject fluid channel 34, defined by side walls 31, is provided within the outer boundaries of interconnected region 28. Subject fluid channel 34 has an outlet 37 between upstream portion and downstream portion of interconnected region 28. The system is thus arranged to deliver a subject fluid from channel 34 into the interconnected region between the upstream portion and the downstream portion. Interconnected region 28 includes a dimensionally-restricted section 40 formed by extensions 42 extending from side walls 29 into the interconnected region. Fluid flowing from upstream portion 30 to downstream portion 32 of the interconnected region must pass through dimensionally-restricted section 40 in the embodiment illustrated. Outlet 37 of subject fluid channel 34 is positioned upstream of the dimensionally-restricted section. In the embodiment illustrated, the downstream portion of interconnected region 28 has a central axis 44, which is the same as the central axis of subject fluid channel 34. That is, the subject fluid channel is positioned to release subject fluid upstream of the dimensionally-restricted section, and in line with the dimensionally-restricted section. As arranged as shown in FIG. 3, subject fluid channel 34 releases subject fluid into an interior portion of interconnected region 28. That is, the outer boundaries of the interconnected region are exterior of the outer boundaries of the subject fluid channel. At the precise point at which fluid flowing downstream in the interconnected region meets fluid released from the subject fluid channel, the subject fluid is surrounded at least in part by the fluid in the interconnected region, but is not completely surrounded by fluid in the interconnected region. Instead, it is surrounded through approximately 50% of its circumference, in the embodiment illustrated.

Figure 5:
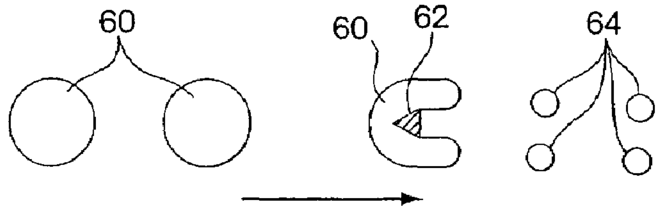
FIG. 5 illustrates the principle of further dispersion of dispersed droplets via an obstruction in accordance with the invention.

Referring now to FIG. 5, one general principle for droplet formation of the invention is illustrated schematically. In FIG. 5 a plurality of subject droplets 60 flow in a direction indicated by arrow 62. Droplets 60 are dispersed-phase droplets contained within a dispersant (surrounding droplets 60, but not specifically indicated in the figure). Droplets 60 are caused to flow against and impact upon an obstruction 62, whereupon droplet 60 is broken up into smaller droplets 64 downstream of the obstruction. Droplets 60 can be directed toward and urged against obstruction 62, and thereby broken up into droplets 64 using any suitable technique including microfluidic techniques described herein.

In one set of embodiments, subject fluid droplets have the largest cross-sectional dimension of no more than 5 millimeters, or 1 millimeter, 500 microns, 250 microns, 100 microns, 60 microns, 40 microns, 20 microns, or even 10 microns. Where the droplets are essentially spherical, the largest cross-sectional dimension will be the diameter of the sphere. Resultant further-dispersed droplets 64 can have the same largest cross-sectional dimensions as those recited immediately above but, of course, will be smaller in cross-sectional dimension than those of droplets 60. Typically, the largest cross-sectional dimension of further-dispersed droplets 64 will be no more than 80% of the largest cross-sectional dimensional of initial subject droplets 60 or no more than 60%, 40%, or 20% the largest cross-sectional dimension of droplets 60.

Figure 6:
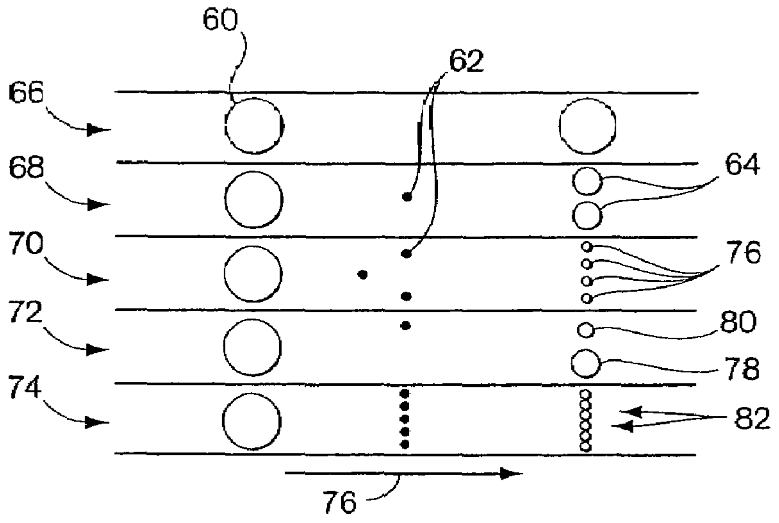
FIG. 6 illustrates five different scenarios involving dispersion via obstructions, or lack thereof.

Referring to FIG. 6, one arrangement for the formation of droplets of a variety of sizes (control of drop size distribution or range) is illustrated. In FIG. 6, a plurality of microfluidic channels 66, 68, 70, 72, and 74 each carry a plurality of subject droplets 60 (in each case represented by one droplet for simplicity), and urge the droplets to flow in a dispersant surrounding the droplets in the direction of arrow 76. Each of channels 66-74 includes a different arrangement of obstructions. Channel 66 is free of any obstruction and droplet 60 is unaffected as it flows downstream. Channel 68, representative of the arrangement of FIG. 5, results in droplets 64 of essentially uniform size downstream of obstruction 62. Channel 70 includes a plurality of obstructions arranged in series, one approximately in the center of channel 70 and two more, downstream of the first, each positioned approximately halfway between the first obstruction and the channel wall. The result can be a plurality of droplets 76 of essentially uniform size, smaller than droplets 64. Channel 72 includes one obstruction, but offset from center. The result can be formation of at least two different drops 78 and 80, of different drop sizes, downstream of the obstruction. Channel 74 includes a plurality of evenly-spaced obstructions across the channel, which can result in an essentially uniform distribution of small droplets 82 downstream thereof. Each of channels 66-74 can represent a separate system for separately producing sets of dispersed droplets of different size or size distribution, or the outlets of some or all of these or other channels can be combined to result in essentially any product having essentially any combination of droplet sizes.

The arrangements of FIG. 6 are highly schematic, and are intended only to represent the variety of dispersions that can be created in accordance with the invention. It is to be understood that the specific distribution of droplets, downstream of obstructions, will vary depending upon factors such as immiscibility (incompatibility) of the dispersed phase within the dispersant (which may be characterized by difference in contact angle measurements of the fluids, or other characteristics known in the art), flow rate, obstruction size and shape, and the like. Although an obstruction of triangular cross-sectional shape is illustrated in FIG. 5, and reproduced highly schematically as obstructions of essentially circular cross-section in FIG. 6, it is to be understood that obstructions of essentially any size and cross-sectional shape can be used (e.g., square, rectangular, triangular, ovoid, circular). Those of ordinary skill in the art can select obstruction size, shape, and placement to achieve essentially any resultant dispersant size and distribution. Shapes and sizes of channels can be selected from a variety as well, for example those described above with respect to FIG. 3.

Figure 7:
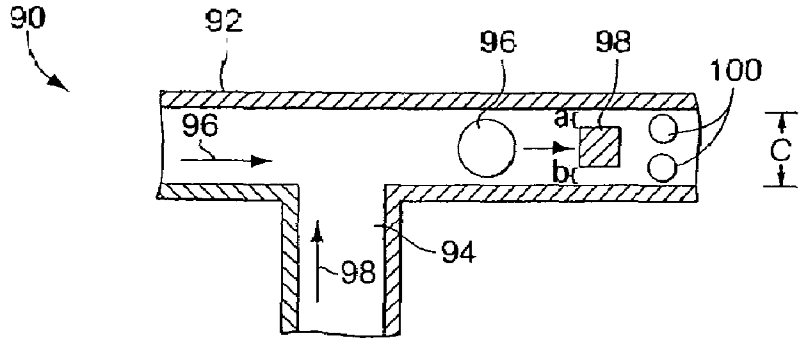
FIG. 7 illustrates formation of a dispersion at a T-junction with further dispersion via an obstruction.

Referring now to FIG. 7, a microfluidic system 90 is illustrated schematically, showing one technique for forming dispersed phase droplets 60, which can be further dispersed using an obstruction(s) in accordance with the invention. System 90 includes a first channel 92, and a second channel 94 arranged perpendicularly to, and terminating at, a "T" junction with channel 92. A dispersant flows within channel 92, upstream of the T-junction, in the direction of arrow 96 and a dispersed phase flows within channel 94, upstream of the T-junction, in the direction of arrow 98. At the T-junction, a dispersed phase of fluid delivered via channel 94 is formed within dispersant delivered via channel 92, represented as fluid droplet 96. Formation of a dispersed phase within a dispersant at a T-junction, as illustrated, is known in the art. Selection of dispersant and a dispersed phase relative pressures in fluid channels, flow rates, etc. all can be selected routinely of those of ordinary skill in the art. In accordance with the invention, an obstruction 98 (represented in FIG. 7 as a centrally-positioned obstruction of square cross-section) causes droplet 96 to be broken into smaller droplets 100 downstream of the obstruction. The transverse placement of obstruction 98, indicated by the relative distances (a) and (b) from each sidewall allows control over the size of the resultant dispersed phase, and range of size distribution, as described above with reference to FIG. 6. Channels 92 and 94 can take essentially any geometrical form. In the embodiment illustrated they are intended to be of essentially square cross-section, with a dimension (c), representing the distance between side walls of less than about 1 millimeter, or other dimensions noted above for channels.).

In an alternate arrangement, rather than forming dispersed phase represented by droplet 96 at a T-junction as shown in FIG. 7, the arrangement illustrated in FIG. 3 can be used upstream of one or more obstructions.

The obstructions can be of essentially any size and cross-sectional configuration. They also can be positioned anywhere within a channel carrying a dispersed phase desirably broken down into a more dispersed phase. For ease of fabrication, the obstructions will typically span the channel from a bottom surface to a top surface thereof (where FIGS. 5, 6, and 7 are looking "down" within a channel), and will generally have uniform cross-sectional geometry throughout this span.

Figure 8:
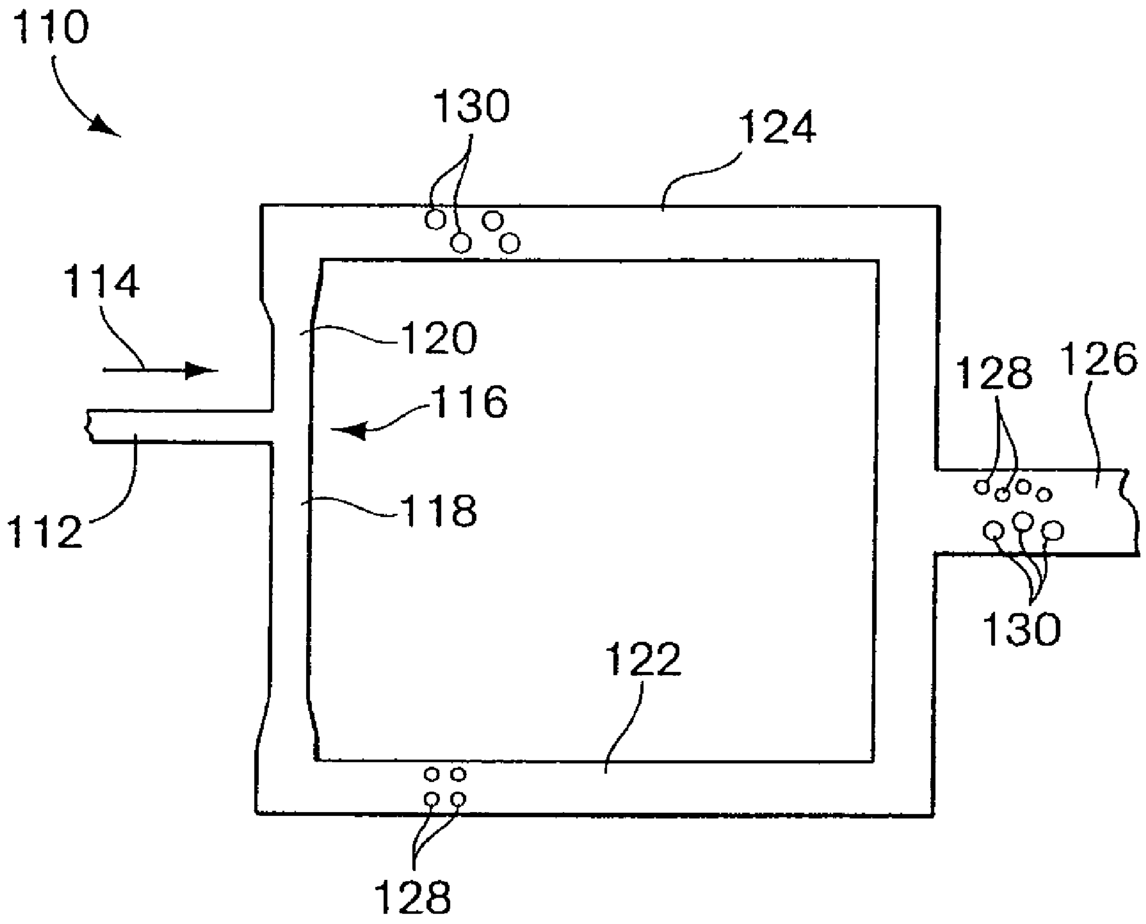
FIG. 8 illustrates differential T-junction dispersion formation via differential backpressure in each branch of the T-junction.

Referring now to FIG. 8, a system 110 for further dispersing a dispersed phase is illustrated schematically. In system 110 an inlet channel 112 delivers fluid flowing in the direction of arrow 114 to a T-junction 116 at which channel 112 perpendicularly abuts a back pressure control channel including sections 118 and 120 emanating, respectively, in opposing directions from the T-junction. Channels 118 and 120 feed, respectively, into collection channels 122 and 124 which eventually combine to deliver fluid into an outlet channel 126.

Channel 112 delivers, in the direction of arrow 114, a dispersed fluid phase within a dispersant fluid phase, formed in any convenient manner (such as those described herein with reference to FIGS. 1 and 3), and under conditions (size of dispersed phase, flow rate, pressure, etc. as known to those of ordinary skill in the art) to cause dispersed phase breakup at T-junction 116. It has been determined in accordance with the invention that the relative flow resistances in each of channels 118 and 120 determine the relative sizes (volumes) of dispersed phase droplets flowing within these channels (represented as relatively smaller droplets 128 delivered by channel 118 and relatively larger droplets 130 delivered by channel 120). These droplets are combined in delivery channel 126. In an otherwise-symmetrical device, the relative lengths of backflow pressure channels 118 and 120 result in proportional backpressure, and proportionally smaller-size drops at higher backpressure (longer channels). Accordingly, the invention involves, in one aspect, delivering first and second fluids from a delivery channel to an intersection of the delivery channel with first and second dispersion channels, and causing dispersion of the first fluid within the second fluid in the first fluid channel at a first dispersion size, and in the second dispersion channel at a second, different dispersion size. This arrangement takes advantage of the extensional flow in the neighborhood of the stagnation point at the T-junction.

When using the T-junction geometry, the formation of small drops generally requires high shear rates in the continuous phase and consequently small drops tend to be associated with small volume fractions of the dispersed phase. At lower shear rates, on the other hand, the dispersed phase forms more elongated shapes which, in turn, implies high dispersed phase volume fractions.

The function and advantage of these and other embodiments of the present invention will be more fully understood from the examples below. The following examples are intended to illustrate the benefits of the present invention, but do not exemplify the full scope of the invention.

EXAMPLES

The following examples demonstrate the use of microfluidic channel geometry to form drops of a subject fluid in a continuous phase of a second, immiscible dispersing fluid.

For the experiments described here, a flow-focusing-like geometry has been fabricated in a planar microchannel design using soft lithography fabrication methods; i.e. the example demonstrates the ability to rapidly produce an integrated microchannel prototype in essentially a single step. The first group of examples used oil and water as two immiscible fluids. Using oil as the continuous phase liquid (dispersing fluid) and water as the dispersed phase (subject fluid), a wide range of drop formation patterns (discontinuous sections) was realized, depending on the flow rates applied to each liquid inlet stream. Variation in size of the resulting discontinuous sections as a function of the oil flow rate, $Q_{oil}$, and the ratio of the oil flow rate to the water flow rate, $R=Q_{oil}/Q_{water}$ was determined. The droplets observed span over three decades in diameter, with the smallest droplets in the range of hundreds of nanometers.

Figure 9:
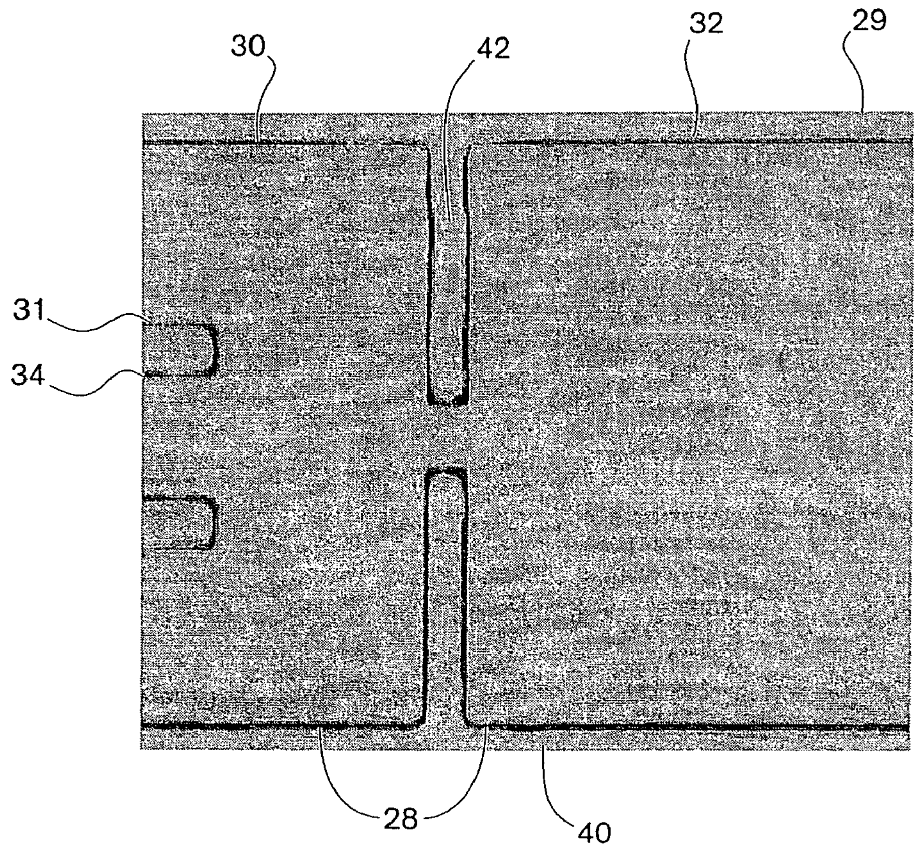
FIG. 9 is a photocopy of a photomagnification of a microfluidic arrangement of the invention, as illustrated schematically in FIG. 3.
Figure 10:
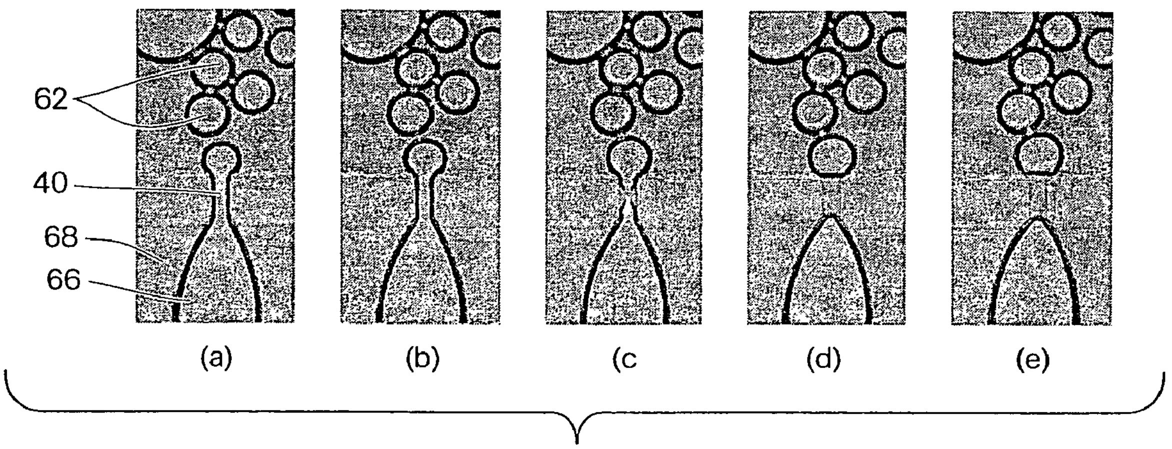
FIG. 10 (images a-e), is a photocopy of photomagnifications of the arrangement of FIG. 5, in use.
Figure 11:
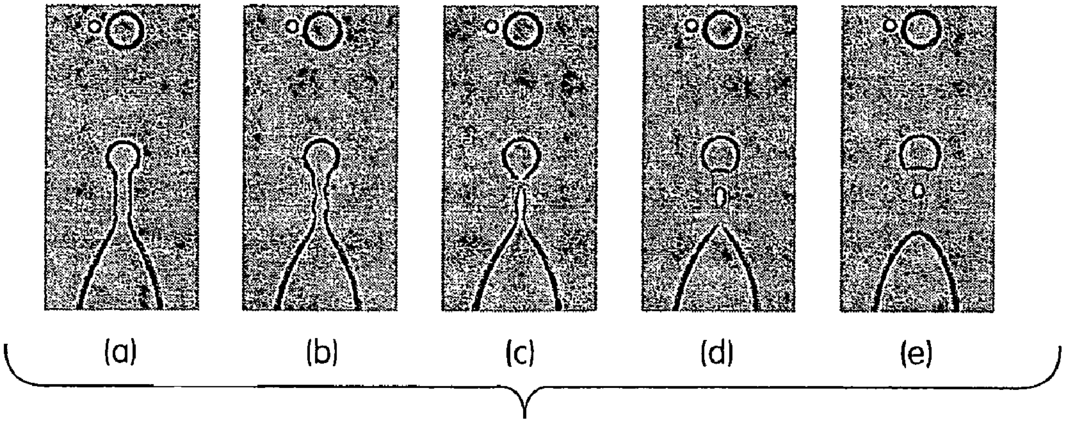
FIG. 11 (images a-e) is a photocopy of a photomagnification of the arrangement of FIG. 5, in use according to another embodiment.
Figure 12:
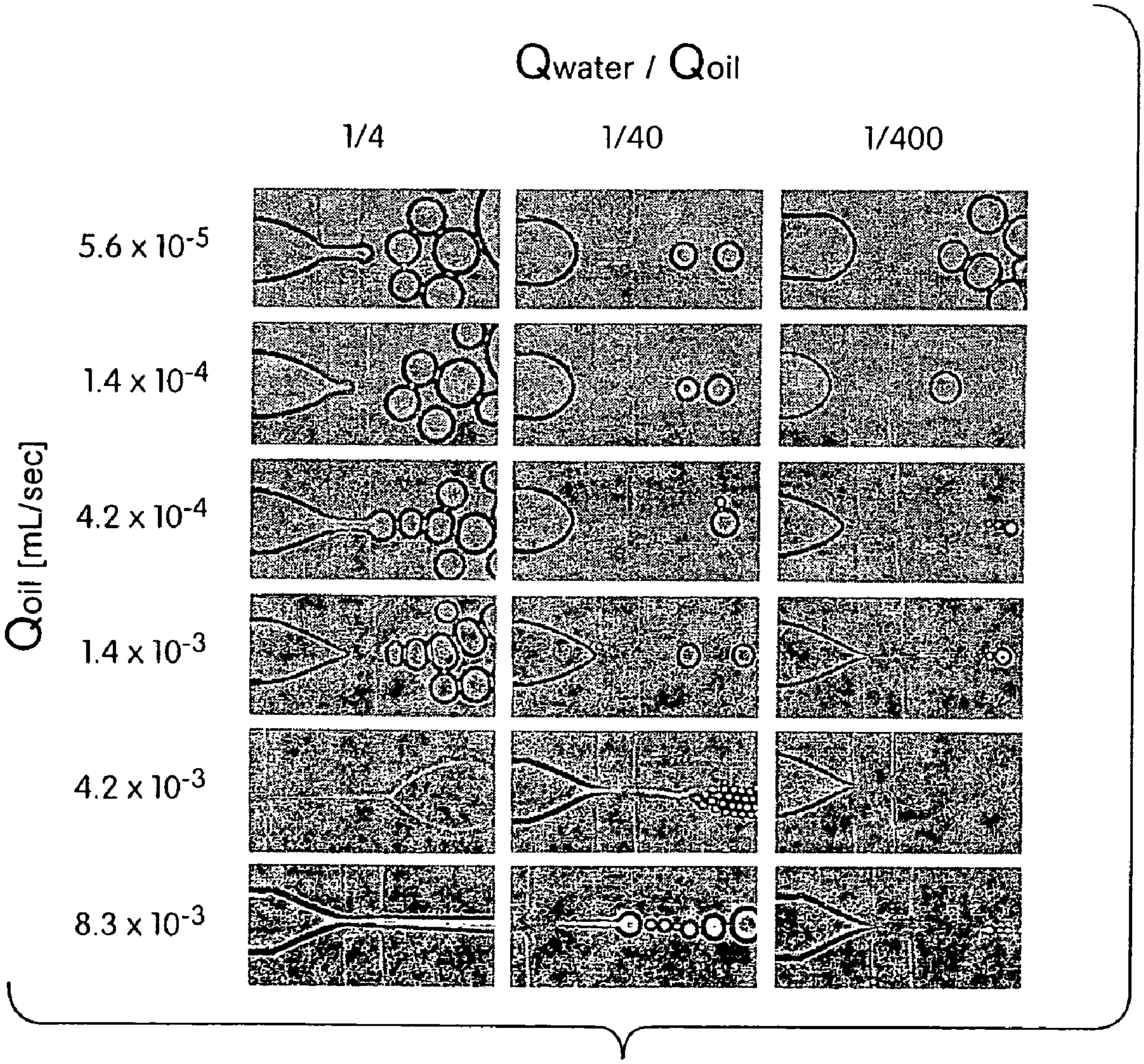
FIG. 12 is a photocopy of photomagnifications of the arrangement of FIG. 5, in use at a variety of fluid flow rates and ratios.

FIG. 9 is a photocopy of photomagnification (10×) of a device made according to the invention, as illustrated schematically in FIGS. 3 and 4. Water as the subject fluid was flowed through subject fluid channel 34, and oil, as an immiscible dispersing fluid, was flowed downstream in the interconnected section surrounding the subject fluid channel. The two liquid phases were then forced to flow through dimensionally-restricted region 40, in the form of an orifice downstream of and in line with the outlet of the subject fluid channel. Dispersing fluid (oil) exerted pressure and viscous stresses that forced the subject fluid into a narrow thread, which then was caused to break inside, or just downstream of, the dimensionally-restricted section. Span 80 surfactant was dissolved in the oil phase to maintain stability of the droplets against coalescence. FIGS. 10-12 are photocopies of photomagnifications (20× magnification) of the formation of discontinuous sections 62 in a subject fluid 66 by action of a dispersing fluid 68, brought into contact with subject fluid 66 and urged through a dimensionally-restricted region 40 in the device. As can be seen, a wide range of size of discontinuous portions 62 can be provided. For example, in FIG. 11 (*e*), discontinuous portions 62 which are specifically labeled 70 and 72, for purposes of this discussion, demonstrate a ratio in maximum cross-sectional dimension of each discontinuous portion of approximately 5:1.

The microfluidic device shown in FIG. 9 (and in FIGS. 10-13) was fabricated from PDMS using soft lithography techniques as described by Duffy, et al., referenced above. Nominally, the largest channel width 50 of the interconnected region (with reference to schematic FIG. 3) was 1 mm, and the width of subject fluid channel 34 was 200 microns. The distance from outlet 36 of the subject fluid channel to the dimensionally-restricted region 40, $H_{focus}$, was 200 microns, diameter of the dimensionally-restricted portion was 50 microns and 100 microns, in two different experiments. The thickness of the internal walls in the device was 100 microns, suitable for maintaining PDMS, from which the walls were made, and a glass top wall 38. The depth of channels (height of walls 29 and 31) was 100 microns. Actual dimensions in use varied slightly since silicone oil swelled the PDMS. These values were determined by microscopy.

The fluids used were distilled water (subject fluid) and silicone oil (dispersing fluid; Silicone Oil AS 4, Fluka). The viscosity of the silicone oil as reported by the manufacturer was 6 mPa·sec. The silicone oil contained 0.67 wt % of Span 80 surfactant (Sorbitan monooleate, Aldrich). The surfactant solution was prepared by mechanically mixing surfactant with silicone oil for approximately 30 minutes and then filtering to eliminate aggregates and prevent clogging of the microchannel.

The fluids were introduced into the microchannel through flexible tubing (Clay Adams Intramedic PE60 Polyethylene Tubing) and the flow rate was controlled using separate syringe pumps for each fluid (Braintree Scientific BS8000 Syringe Pump). In the embodiment of the invention demonstrated here, the flow rate of the dispersing fluid (oil), $Q_o$, was always greater than the flow rate of the subject fluid (water), $Q_i$. Three different flow rate ratios were chosen, $Q_o/Q_i=4$, 40, and 400, where the oil flow rate given corresponded to the total flow rate in both oil inlet streams. For each $Q_o/Q_i$, oil flow rates spanning more than two orders of magnitude were chosen ($4.2\times10^{-5}$ ml/sec<=$Q_o$, <=$8.3\times10^{-3}$ ml/sec). At each value of $Q_o$ and $Q_i$, drop formation inside and just downstream of the orifice was visualized using an inverted microscope (Model DM IRB, Leica Microsystems) and a high-speed camera (Phantom V5.0, Photo-Sonics, Inc.; up to 6000 frames/sec). Image processing was used to measure drop sizes, which are reported as an equivalent sphere diameter.

FIG. 10 (images a-e), is a photocopy of 20× photomagnifications of the device of FIG. 9, in use. Experimental images of drop breakup sequences occurring inside the dimensionally-restricted region (orifice) are shown. Uniform-sized drops were formed without visible satellites, breakup occurred inside the orifice. The time interval between images was 1000 microseconds. $Q_o=8.3\times10^{-5}$ ml/sec and $Q_o/Q_i=4$.

FIG. 11 (images a-e) is a photocopy of 20× photomagnification of the device of FIG. 9, in use under different conditions. A small satellite (discontinuous region) accompanies each large drop (discontinuous region); breakup occurred at two corresponding locations inside the orifice. The time interval between images was 166 microseconds; $Q_o=4.2\times10^{-4}$ ml/sec and $Q_o/Q_i=40$.

FIG. 12 is a photocopy of photomagnifications of the arrangement of FIG. 9, in use at a variety of fluid flow rates and ratios. Each image represents sizes of discontinuous regions (drop) and patterns that form at the specified value of $Q_o$ (rows) and $Q_o/Q_i$ (columns). The magnification was 20×.

Figure 13:
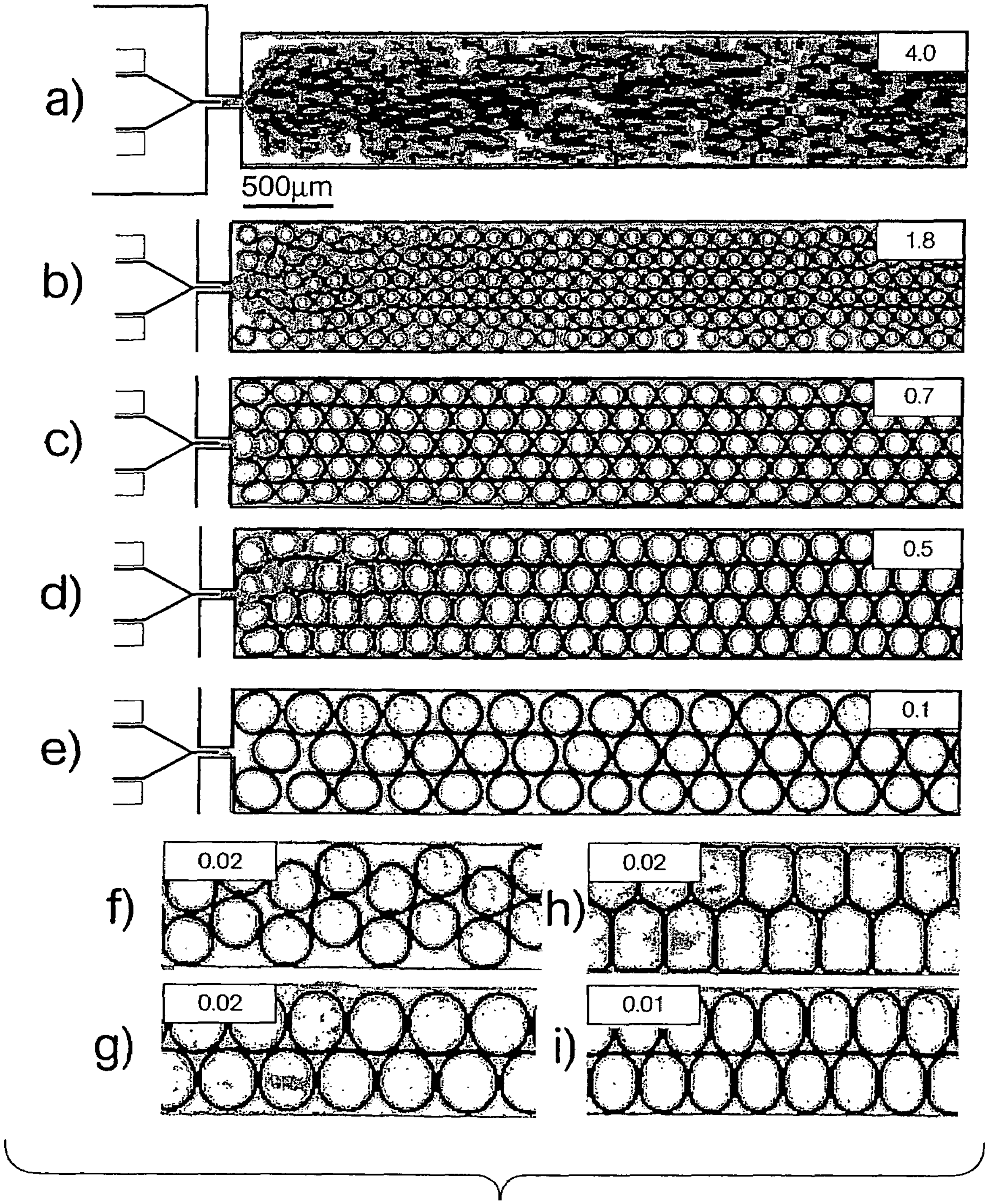
FIG. 13 (sections a-e) are photocopies of photomicrographs showing dispersion of a gas in a liquid.

FIG. 13 provides a series of photomicrographs showing the formation of gas bubbles in a liquid. The gas dispersions were made using a microfluidic focusing device like that shown in FIG. 3. The subject fluid was nitrogen and the dispersion fluid was water. The subject fluid channel had a width of 200 μm, and each of the two dispersion fluid channels had a width of 250 μm. The constricted area was an annular orifice having a width of 30 μm. The width of the outlet channel was 750 μm. The pressure of the nitrogen fed to the subject fluid channel was 4 psi. The flow rate of the aqueous dispersion phase was varied stepwise from 4 mL/h down to 0.01 mL/h. As shown in FIG. 13(*a*), at higher flow rates of dispersion fluid (4 mL/h), the volume fraction of gas in the outflowing fluid was small and the bubbles were not ordered. As dispersion fluid flow rate was decreased to 1.8 mL/h (FIG. 13(*b*)) distinct bubbles were visible but were still not well ordered. As the flow rate of the dispersion fluid decreased to 0.7 mL/h (FIG. 13(*c*)) a greater volume fraction of nitrogen and an increasing amount of order was seen. This trend continued through FIGS. 13(*d*) and (*e*) with flow rates of 0.5 and 0.1 mL/h, respectively. At even lower flow rates, as shown in FIGS. 13(*f*) through (*i*), the dispersed fluid portions (nitrogen) start to lose their round shape. It is believed that a dispersion will form a foam when gas bubbles start to take on non-circular polygonal shapes as shown in FIGS. 13(*h*) and (*i*). It is believed that these non-circular shapes tend to occur once the volume fraction of gas becomes greater than about 90% in the dispersion. These photomicrographs demonstrate the ability of the invention to form ordered phases in a liquid at high volume fractions.

Another device was made to further disperse fluid portions that formed a dispersion in an immiscible fluid. A series of microchannels were fabricated from polydimethyl siloxane (PDMS) using known soft lithography fabrication techniques (see, for example, Xia et al., Angew. Chem., Int. Ed. Engl., Vol. 37, p. 550, 1998, incorporated by reference; WO 96/29629, referenced above). For each of the examples described herein, original drop formation occurs at a T-junction and flow rates are chosen to maintain drops of nearly uniform size. Channel heights were 30 microns, and at the T-junction where drops were first formed, channel widths were also 30 microns. In the case of obstruction-assisted breakup, the obstruction had a cross-section of a square, 60 microns across, and the channel widths varied from 120 to 240 microns depending upon the placement within the channel of the obstruction (relative ratios of (a) to (b) as illustrated in FIG. 7). Distilled water was selected to form the dispersed phase and hexadecane (shear viscosity equal to 0.08 g/cm·sec) was used as the continuous phase. 2.0 wt % Span 80 surfactant was added to the oil phase to assist drop formation. Individual syringe pumps were used to control the flow rate of the two phases.

Figure 14:
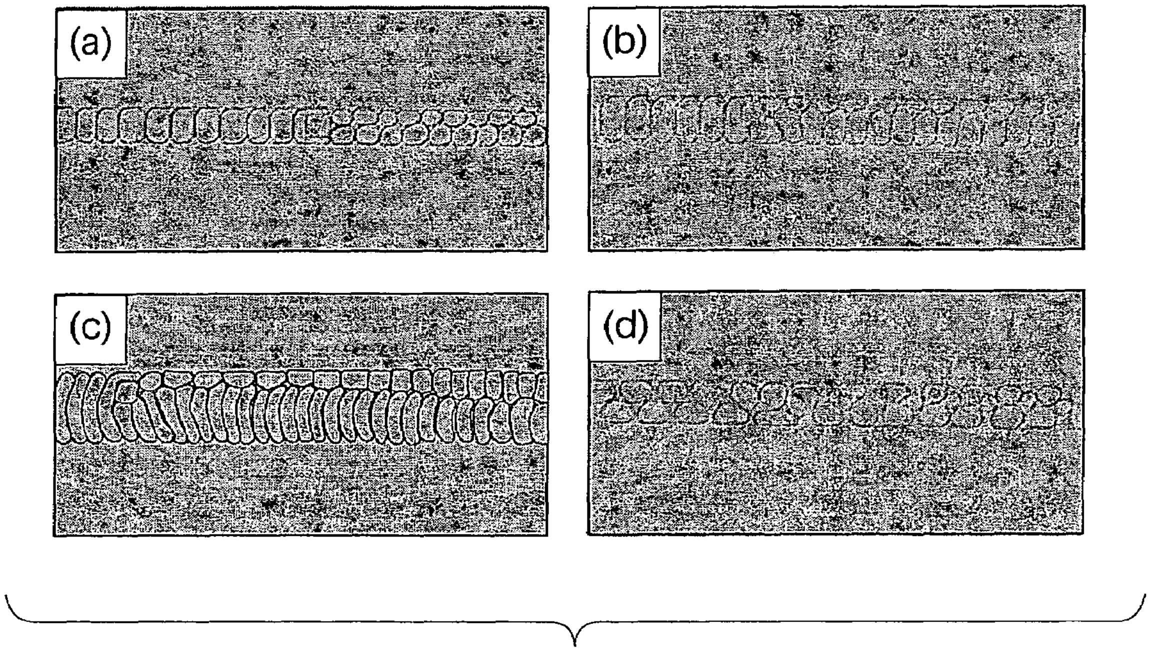
FIG. 14 (sections a-d) are photocopies of photomicrographs showing further dispersion of dispersed species via obstructions in microfluidic systems.

FIG. 14(*a*) shows a single column of drops, with size comparable to the channel, flowing past an obstruction placed in the middle of the channel. The drops deform as they flow in the gaps surrounding the obstruction and break into further dispersed drops just down stream of the obstruction. FIGS. 14(*b*) and (*c*) illustrate that changing the asymmetric location of the obstruction allows control of the relative sizes of the further dispersed droplets. In addition, changes of the packing configuration of dispersed droplets can occur downstream of the obstruction. FIG. 14(*d*) illustrates that when a two layer configuration of droplets encounters an obstruction placed off center, the device can be arranged such that only drops in one of the layers is further dispersed, and consequently the result is a regular sequence of three different sizes of drops. Note that in order for this passive route of drop breakup to occur, the dispersed phase of volume fraction should be relatively large so that drops are forced to deform around the obstruction rather than simply passing through narrow gaps.

In each of FIGS. 14(*a-d*) the obstruction was a 60 micron cross-section square. In (a) the obstruction was placed in the center of the channel so that the ratio (a):(b) was 1:1. In (b) the channel width was 150 microns and the ratio (a):(b) is 1:2. In (c) the channel width was 240 microns and the ratio of (a):(b) was 1:5. In (d) every second drop was further dispersed when a two-layer pattern encountered an off-center obstruction.

Figure 15:
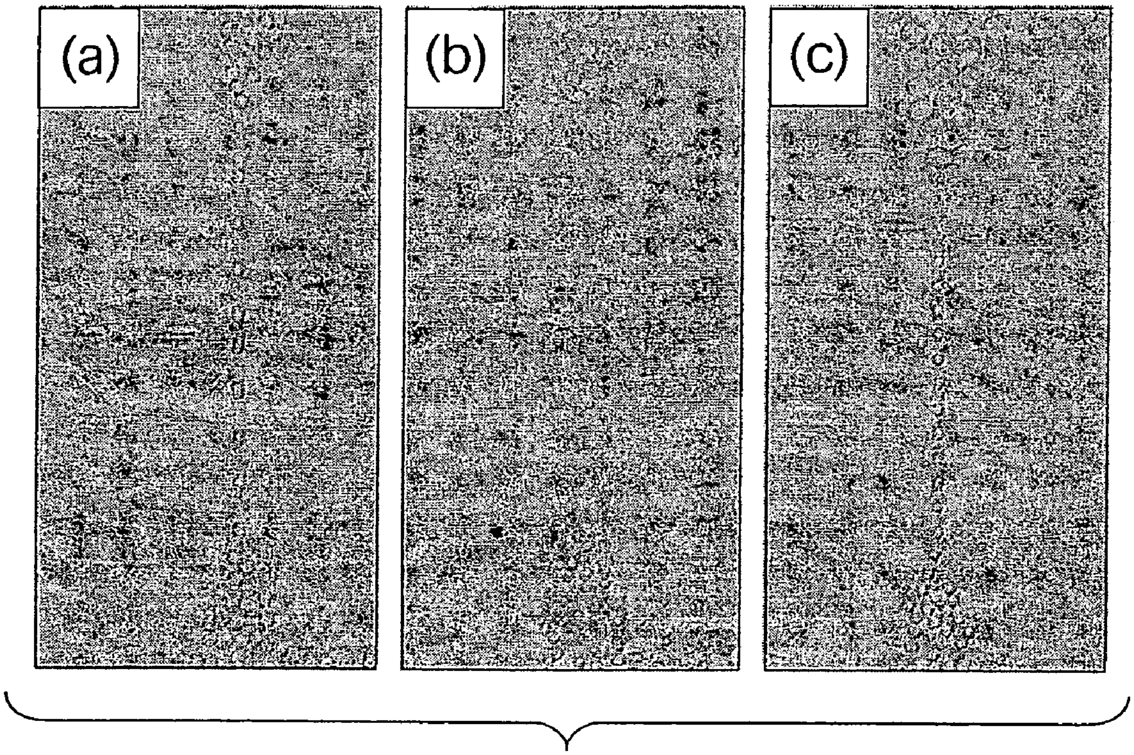
FIG. 15 (sections a-c) are photocopies of photomicrographs of further dispersion of a dispersed species at a T-junction, with differential dispersion dictated by differential backpressure.

FIG. 15 illustrates further dispersion of a dispersed system via subjecting it to extensional flow in the neighborhood of T-junction. For flow rates below a critical value, individual drops do not break but rather flow alternately into each of the side channels. For any given ratio of drop diameter to channel width there is a critical flow rate above which drops break, as shown in FIG. 15(*a*) where every drop breaks into two further-dispersed droplets of equal size. The relative sizes of the further-dispersed droplets can be controlled by the flow resistances of the side channels, which, in turn, are functions of their lengths and cross-sections. FIGS. 15(*b*) and (*c*) show designs where the side channels have length ratios increasingly offset from 1:1. The flow resistance for laminar channel flow is proportional to the channel length. Since the flow resistance sets the relative volume flow rates and the side channels, the drop volumes vary with the length ratios as well. Not only can flow resistance be controlled by relative length of flow channels, but pressure-actuated valves can be used as well.

Figure 16:
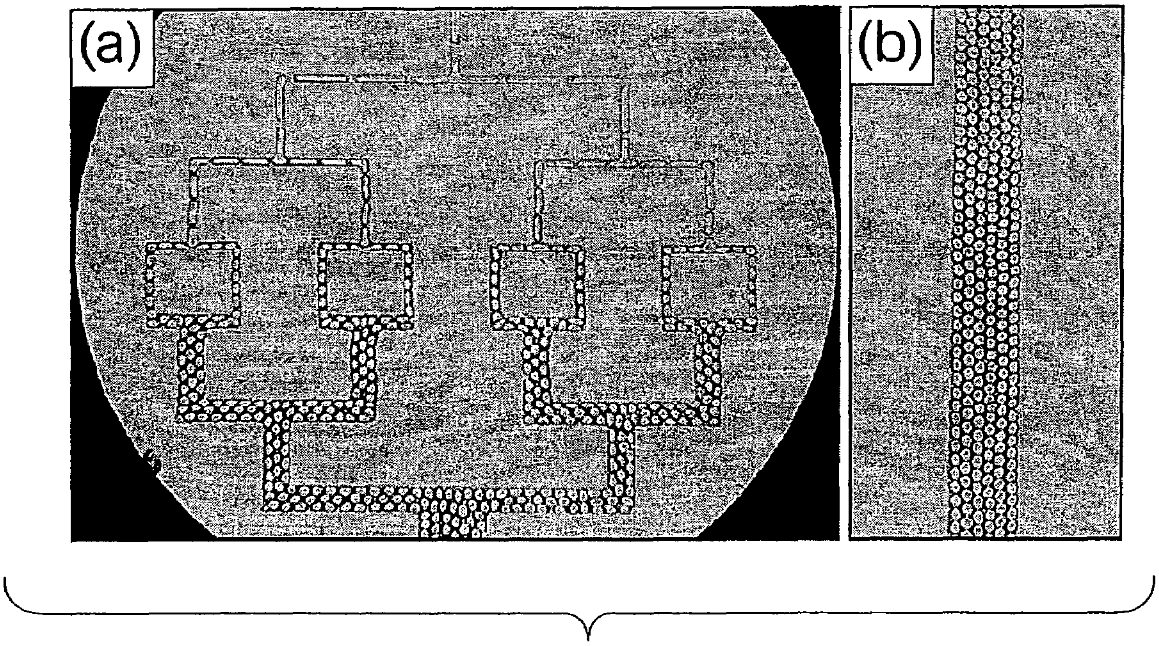
FIG. 16 (sections a-b) are photocopies of photomicrographs of further dispersion of a dispersed species via a serial T-junction (a), and results in highly-dispersed species (b).

FIG. 16 shows sequential application of geometrically mediated T-junction breakup of large segments of dispersed phase into formation of smaller, further-dispersed droplets of size comparable to channel cross-section. In particular, at a single inlet (top of section (a)), large volumes of dispersed phase within dispersant are provided. The ratio of dispersed phase to dispersant is large, at least 4:1. At a first T-junction, the dispersed phase is broken into segments approximately half as large in volume as those delivered through the initial inlet. Each of the outlets from the first T-junction serves as a inlet for another T-junction, through two more generations of T-junctions, and the resultant eight outlets are recombined into a single collection, or product channel containing highly-dispersed droplets within dispersant (FIG. 16(*b*)).

Those of ordinary skill in the art will recognize that auxiliary components, not shown or described in detail herein, are useful in implementing the invention. For example, sources of various fluids, means for controlling pressures and/or flow rates of these fluids as delivered to channels shown herein, etc. Those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as “comprising”, “including”, “carrying”, “having”, “containing”, “involving”, “composed of”, “made of”, “formed of” and the like are to be understood to be open-ended, i.e. to mean including but not limited to. Only the transitional phrases “consisting of” and “consisting essentially of” shall be closed or semi-closed transitional phrases, respectively, as set forth in the United States Patent Office Manual of Patent Examining Procedures, section 2111.03.

What is claimed is:

1. A method comprising:

providing a microfluidic interconnected region having an upstream portion, a downstream portion, and a dimensional restriction defining the downstream portion of the microfluidic interconnected region, the interconnected region being connected at its upstream portion to two or more microfluidic inlet channels, wherein the dimensional restriction is formed by at least an extension of a wall defining the interconnected region, the extension being in a direction transverse to the flow of fluid in the interconnected region; and creating discontinuous sections of a subject fluid at the interconnected region, at least some of the discontinuous sections having a maximum dimension of less than 100 microns.

2. The method of claim 1, comprising creating the discontinuous sections of the subject fluid by surrounding the subject fluid, at least in part, by a continuous fluid, in the upstream portion of the interconnected region, and focusing the continuous fluid surrounding the subject fluid, at least in part, with the dimensional restriction.

3. The method of claim 2, wherein the continuous fluid comprises oil.

4. The method of claim 2, wherein each the subject fluid and the continuous fluid have a flow rate, and the ratio of the flow rate of the subject fluid to the continuous fluid is less than 1:5.

5. The method of claim 2, wherein the continuous fluid completely circumferentially surrounds the subject fluid.

6. The method of claim 1, wherein the subject fluid flows though the interconnected region at a constant rate.

7. The method of claim 1, wherein the interconnected region has a maximum cross-sectional diameter of less than 50 microns.

8. The method of claim 1, wherein the subject fluid comprises water.

9. The method of claim 2, wherein the continuous fluid is immiscible with the subject fluid within the time flame of formation of the discontinuous sections of the subject fluid.

10. The method of claim 1, wherein the microfluidic interconnected region, the upstream portion, and the downstream portion are each contained within a microfluidic device.

11. The method of claim 1, wherein the downstream portion has a largest dimension perpendicular to fluid flow of less than about 5 mm.

12. The method of claim 1, wherein the downstream portion has a largest dimension perpendicular to fluid flow of less than about 1 mm.

13. The method of claim 1, wherein at least some of the discontinuous sections have a maximum dimension of less than 80 microns.

14. The method of claim 1, wherein at least some of the discontinuous sections have a maximum dimension of less than 60 microns.

15. The method of claim 1, wherein at least some of the discontinuous sections have a maximum dimension of less than 40 microns.

16. The method of claim 1, wherein at least some of the discontinuous sections have a maximum dimension of less than 20 microns.

17. The method of claim 1, wherein the interconnected region is connected at its upstream portion to three or more microfluidic inlet channels.

* * * * *